(12) United States Patent
Pedersen et al.

(10) Patent No.: US 7,120,362 B2
(45) Date of Patent: *Oct. 10, 2006

(54) HIGH POWER REPEATERS FOR RAMAN AMPLIFIED, WAVE DIVISION MULTIPLEXED OPTICAL COMMUNICATION SYSTEMS

(76) Inventors: Bo Pedersen, 1698 Saefern Way, Annapolis, MD (US) 21041; Ronald E. Johnson, 210 Seneca Ter., Pasadena, MD (US) 21122

( * ) Notice: Subject to any disclaimer, the term of this patent is extended or adjusted under 35 U.S.C. 154(b) by 737 days.

This patent is subject to a terminal disclaimer.

(21) Appl. No.: 09/969,153

(22) Filed: Oct. 3, 2001

(65) Prior Publication Data

US 2003/0072062 A1 Apr. 17, 2003

(51) Int. Cl.
*H04B 10/00* (2006.01)

(52) U.S. Cl. .................. 398/104; 398/105; 398/173; 398/180

(58) Field of Classification Search .............. 398/97, 398/173–181, 104, 105, 99
See application file for complete search history.

(56) References Cited

U.S. PATENT DOCUMENTS

| | | | | |
|---|---|---|---|---|
| 3,705,992 | A | 12/1972 | Ippen et al. | 307/88.3 |
| 4,401,364 | A | 8/1983 | Mochizuki | 350/96.16 |
| 4,616,898 | A | 10/1986 | Hicks, Jr. | 350/96.15 |
| 4,805,977 | A | 2/1989 | Tamura et al. | 350/96.16 |
| 4,913,507 | A * | 4/1990 | Stamnitz et al. | 385/122 |
| 5,038,406 | A * | 8/1991 | Titterton et al. | 398/125 |
| 5,173,957 | A | 12/1992 | Bergano et al. | 385/24 |
| 5,642,219 | A | 6/1997 | Ogiya et al. | 359/341 |
| 5,764,405 | A | 6/1998 | Alphonsus | 359/341 |
| 5,920,423 | A | 7/1999 | Grubb et al. | 359/341 |
| 5,991,069 | A | 11/1999 | Jander | 359/337 |
| 6,081,366 | A * | 6/2000 | Kidorf et al. | 359/341.32 |
| 6,292,288 | B1 | 9/2001 | Akasaka et al. | 359/334 |
| 6,731,877 | B1 * | 5/2004 | Cao | 398/91 |
| 2001/0048545 | A1 * | 12/2001 | Shimojoh | 359/341.1 |
| 2003/0072063 | A1 * | 4/2003 | Adams et al. | 359/174 |

OTHER PUBLICATIONS

AT&T Technical Journal: A Journal of the AT&T Companies, vol. 74, No. 1, Jan./Feb. 1995, 106 pages.

Kidorf, H. et al., "Pump Interactions in a 100-nm Bandwidth Raman Amplifier", IEEE Photonics Technology Letters, vol. 11, No. 5, May 1999, pp. 530-532.

Emori, Y. et al., "Demonstration of Broadband Raman Amplifiers: a Promising Application of High-power Pumping Unit", Furukawa Review, No. 19, 2000, pp. 59-62.

Bergano, N., "Chapter 10: Undersea Amplified Lightwave Systems Design", Optical Fiber Telecommunications, vol. IIIA, 1997, pp. 302-335.

* cited by examiner

*Primary Examiner*—David C. Payne
(74) *Attorney, Agent, or Firm*—Harrity Snyder, LLP

(57) ABSTRACT

High power repeaters for use in amplifying optical data signals transmitted through undersea fiber optic cables are disclosed. Raman amplification schemes using 100 or more pump lasers are integrated into industry standard sized pressure vessels for amplifying optical data signals transmitted through one or more fiber optic pairs. Other repeater features include high density packaging, efficient power distribution, and component sharing.

39 Claims, 26 Drawing Sheets

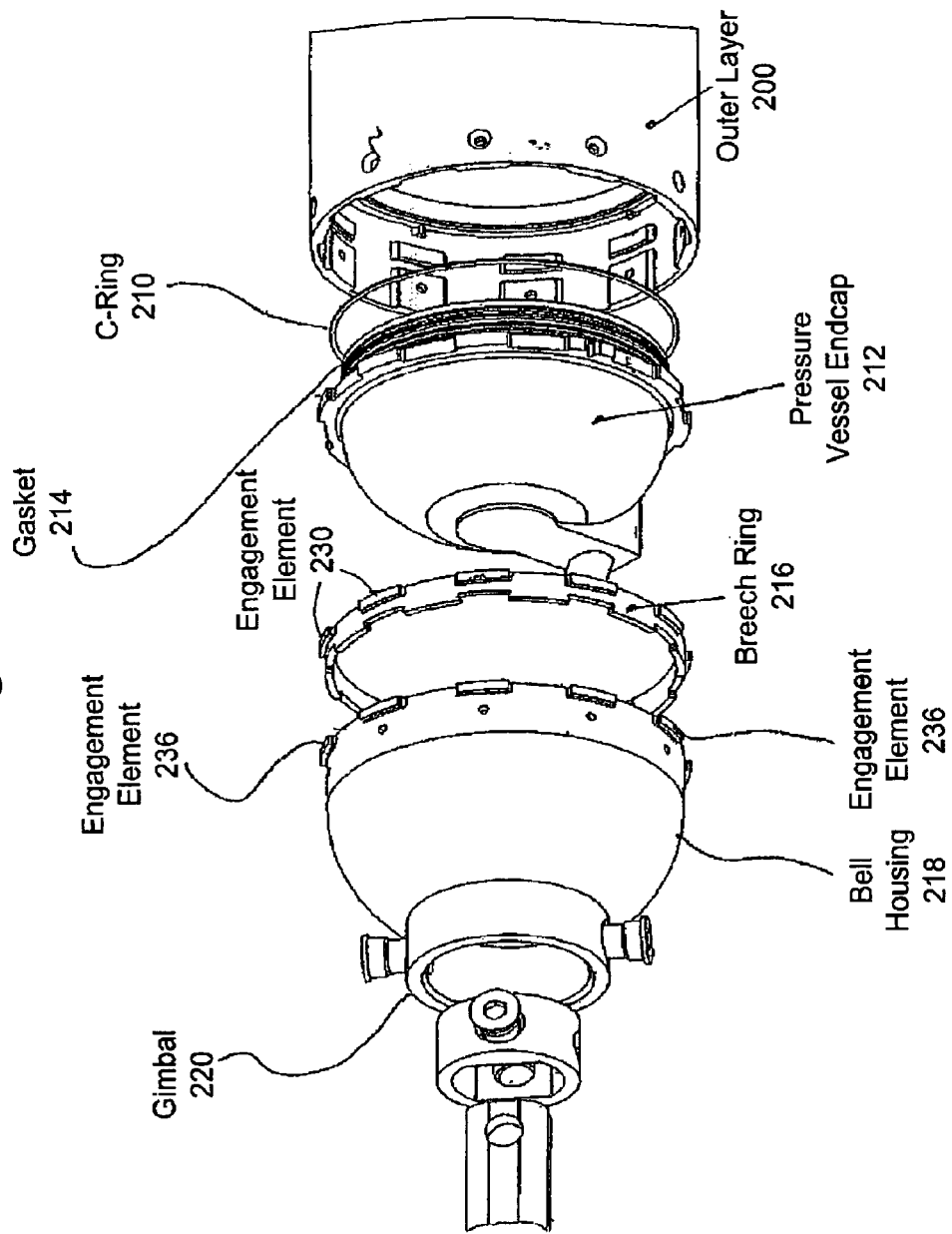

Seam Structure

Seam Structure

HIGH POWER REPEATERS FOR RAMAN AMPLIFIED, WAVE DIVISION MULTIPLEXED OPTICAL COMMUNICATION SYSTEMS

BACKGROUND

From the advent of the telephone, people and businesses have craved communication technology and its ability to transport information in various formats, e.g., voice, image, etc., over long distances. Typical of innovations in communication technology, recent developments have provided enhanced communications capabilities in terms of the speed at which data can be transferred, as well as the overall amount of data being transferred. As these capabilities improve, new content delivery vehicles, e.g., the Internet, wireless telephony, etc., drive the provision of new services, e.g., purchasing items remotely over the Internet, receiving stock quotes using wireless short messaging service (SMS) capabilities etc., which in turn fuels demand for additional communications capabilities and innovation.

Recently, optical communications have come to the forefront as a next generation communication technology. Advances in optical fibers over which optical data signals can be transmitted, as well as techniques for efficiently using the bandwidth available on such fibers, such as wavelength division multiplexing (WDM), have resulted in optical technologies being the technology of choice for state-of-the-art long haul communication systems.

For long haul optical communications, e.g., greater than several hundred kilometers, the optical signal must be periodically amplified to compensate for the tendency of the data signal to attenuate. For example, in the submarine optical communication system 10 shown in FIG. 1, the terrestrial signal is processed in WDM terminal 12 for transmission via optical fiber 14. Typically, each system 10 is implemented using a number (e.g., 2, 4, 6, 8, 10, 12, etc.) of pairs of optical fibers. Periodically, e.g., every 75 km, a repeater 16 amplifies the transmitted signal so that it arrives at WDM terminal 18 with sufficient signal strength (and quality) to be successfully transformed back into a terrestrial signal.

Conventionally, erbium-doped fiber amplifiers (EDFAs) have been used for amplification in the repeaters 16 of such systems. As seen in FIG. 2(a), an EDFA employs a length of erbium-doped fiber 20 inserted between the spans of conventional fiber 22. A pump laser 24 injects a pumping signal having a wavelength of, for example, approximately 1480 nm into the erbium-doped fiber 20 via a coupler 26. This pumping signal interacts with the f-shell of the erbium atoms to stimulate energy emissions that amplify the incoming optical data signal, which has a wavelength of, for example, about 1550 nm. One drawback of EDFA amplification techniques is the relatively narrow bandwidth within which this form of resonant amplification occurs, i.e., the so-called erbium spectrum. Future generation systems will likely require wider bandwidths than that available from EDFA amplification in order to increase the number of channels (wavelengths) available on each fiber, thereby increasing system capacity.

Distributed Raman amplification is one amplification scheme that can provide a broad and relatively flat gain profile over a wider wavelength range than that which has conventionally been used in optical communication systems employing EDFA amplification techniques. Raman amplifiers employ a phenomenon known as "stimulated Raman scattering" to amplify the transmitted optical signal. In stimulated Raman scattering, as shown in FIG. 2(b), radiation from a pump laser 24 interacts with a gain medium 22 through which the optical transmission signal passes to transfer power to that optical transmission signal. One of the benefits of Raman amplification is that the gain medium can be the optical fiber 22 itself, i.e., doping of the gain material with a rare-earth element is not required as in EDFA techniques. The wavelength of the pump laser 24 is selected such that the vibration energy generated by the pump laser beam's interaction with the gain medium 22 is transferred to the transmitted optical signal in a particular wavelength range, which range establishes the gain profile of the pump laser.

Although the ability to amplify an optical signal over a wide bandwidth makes Raman amplification an attractive option for next generation optical communication systems, the use of a relatively large number of high power pump lasers (and other components) for each amplifier in a Raman system has hitherto made EDFA amplification schemes the technology of choice for long haul optical communication systems. However, as the limits of EDFA amplification are now being reached, recent efforts have begun to explore the design issues associated with supplementing, or replacing, EDFA amplification technology with Raman amplification technology.

In order to design a wideband, Raman-amplified optical communication system, however, a much larger number of active and passive optical and electrical components need to be housed in each repeater 16 than were previously needed in conventional submarine optical communication systems. Additionally, the amount of optical fiber, and the number of fiber splices, needed to interconnect the optical components will also increase dramatically. For example, Applicants have estimated that implementation of an eight fiber pair, wideband, Raman-amplified optical communication systems may require repeaters which have 150–300 (or more) lasers, 500 to 800 (or more) passive optical components, 1000–2000 meters of optical fiber and 600–900 (or more) optical splices.

Even as the number of components, length of fiber and amount of power needed to operate those components has increased, the physical size of the repeater 16 is restricted by, for example, operational, deployment, transportation and storage considerations. Thus, according to exemplary embodiments of the present invention, it is preferable to design structures and techniques for accommodating the aforedescribed optical components and fiber (as well as other components) within a repeater 16 having substantially the dimensions (in millimeters) illustrated in FIG. 3.

These, and other, design considerations and constraints dictate a need for new repeater designs, structures and techniques which will enable next generation, high power optical communication systems to be deployed.

BRIEF SUMMARY OF THE INVENTION

These, and other, drawbacks, limitations and problems associated with conventional optical communication systems are overcome by exemplary embodiments of the present invention, wherein a high power repeater for use in an undersea optical communication includes a pressure vessel, a frame, disposed within the pressure vessel, for holding optical signal amplification circuitry and other circuitry, wherein the repeater draws more than 250 watts to power said optical signal amplification circuitry and other circuitry.

According to another exemplary embodiment of the present invention, a high power repeater for use in an undersea optical communication system includes a pressure vessel, a frame, disposed within the pressure vessel, for holding optical signal amplification circuitry and other circuitry, wherein the optical signal amplification circuitry includes at least 100 pump lasers for Raman amplification of optical data signals.

BRIEF DESCRIPTION OF THE DRAWINGS

FIG. 8 illustrates an exploded view of one end of a repeater having a pressure vessel joint according to an exemplary embodiment of the present invention;

DESCRIPTION OF PREFERRED EMBODIMENTS

In the following description, for the purposes of explanation and not limitation, specific details are set forth, such as particular systems, networks, software, components, techniques, etc., in order to provide a thorough understanding of the present invention. However, it will be apparent to one skilled in the art that the present invention may be practiced in other embodiments that depart from these specific details. In other instances, detailed descriptions of known methods, devices and circuits are abbreviated or omitted so as not to obscure the present invention.

Figure 1:
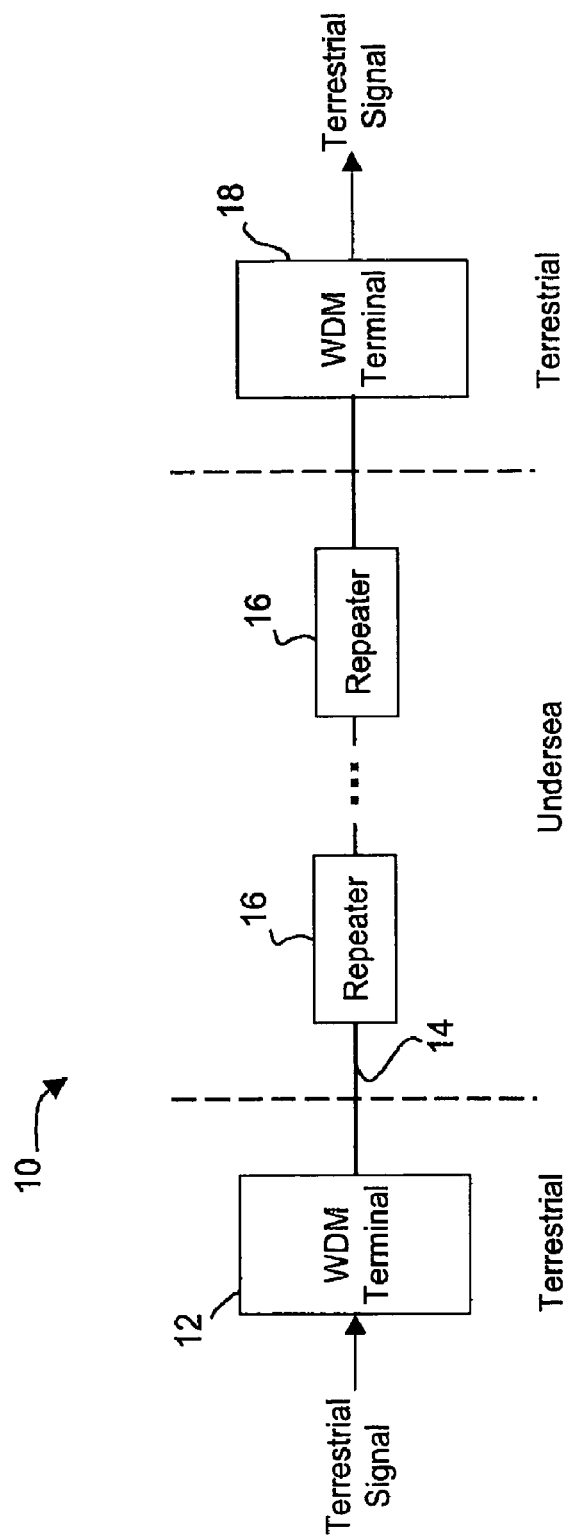
FIG. 1 is a schematic diagram of an optical communication system in which the present invention can be implemented.
Figure 2A:
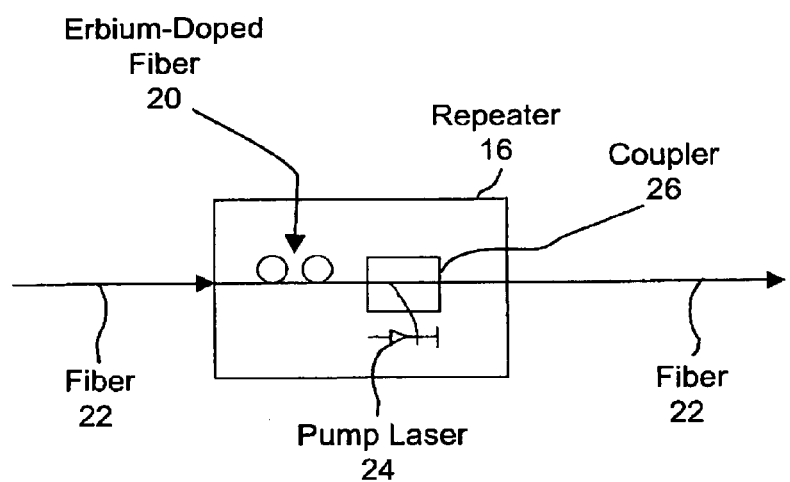
FIG. 2(a) is a conceptual diagram of a conventional erbium-doped fiber amplifier.
Figure 2B:
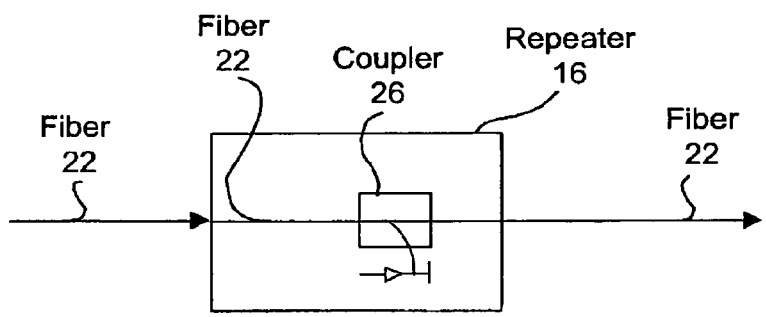
FIG. 2(b) is a conceptual diagram of a conventional Raman amplifier.

Repeaters which enable high power Raman-amplified optical signal transmission systems can be employed in systems such as those depicted in FIG. 1, i.e., submarine optical communication systems, or in terrestrial systems. For the purpose of illustration, rather than limitation, an exemplary Raman-amplified system is described below for context. Those skilled in the art will appreciate that many different system configurations could also utilize repeater designs, structures and techniques according to the present invention.

Figure 4:
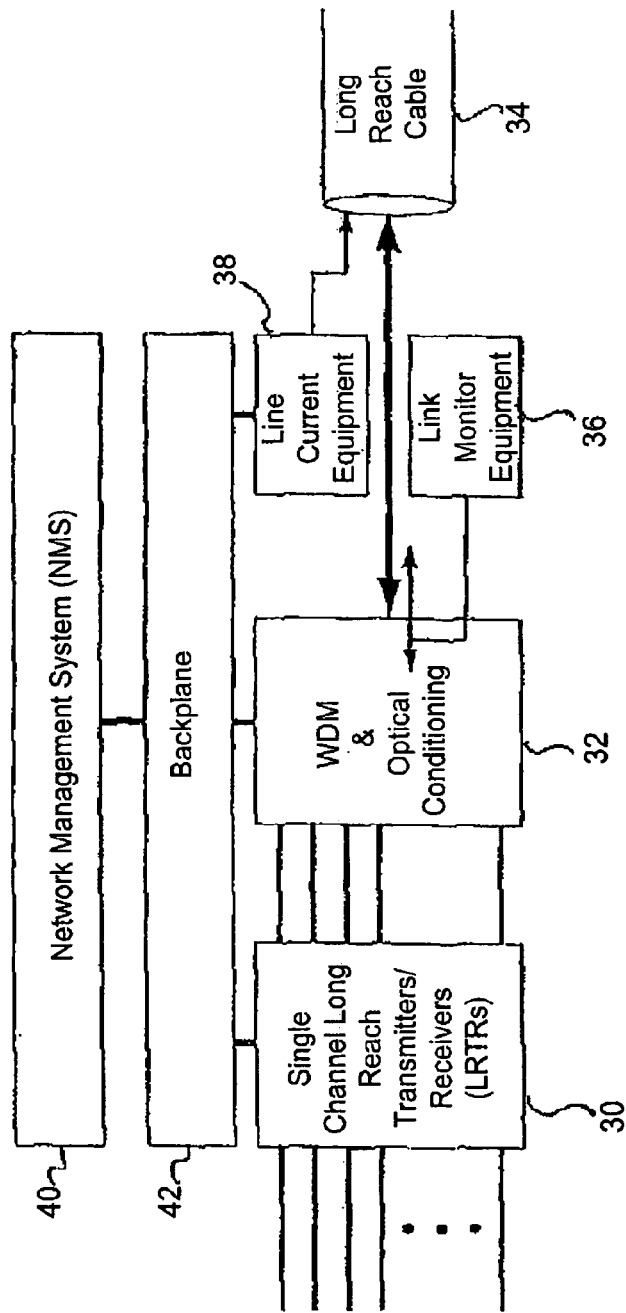
FIG. 4 is a block diagram of an exemplary terminal unit of an optical communication system including link monitoring equipment according to exemplary embodiments of the present invention.

An exemplary architecture for terminal 12 and 18 is provided in the block diagram of FIG. 4. Therein, the long reach transmitters/receivers (LRTRs) 30 convert terrestrial signals into an optical format for long haul transmission, convert the undersea optical signal back into its original terrestrial format and provide forward error correction. The WDM and optical conditioning unit 32 multiplexes and amplifies the optical signals in preparation for their transmission over cable 34 and, in the opposite direction, demultiplexes optical signals received from cable 34. The link monitor equipment 36 monitors the undersea optical signals and undersea equipment for proper operation. The line current equipment 38 provides power to the undersea repeaters 36. The network management system (NMS) 40 controls the operation of the other components in the WDM terminal, as well as sending commands to the repeaters 36 via the link monitor equipment 36, and is connected to the other components in the WDM terminal via backplane 42.

Figure 5:
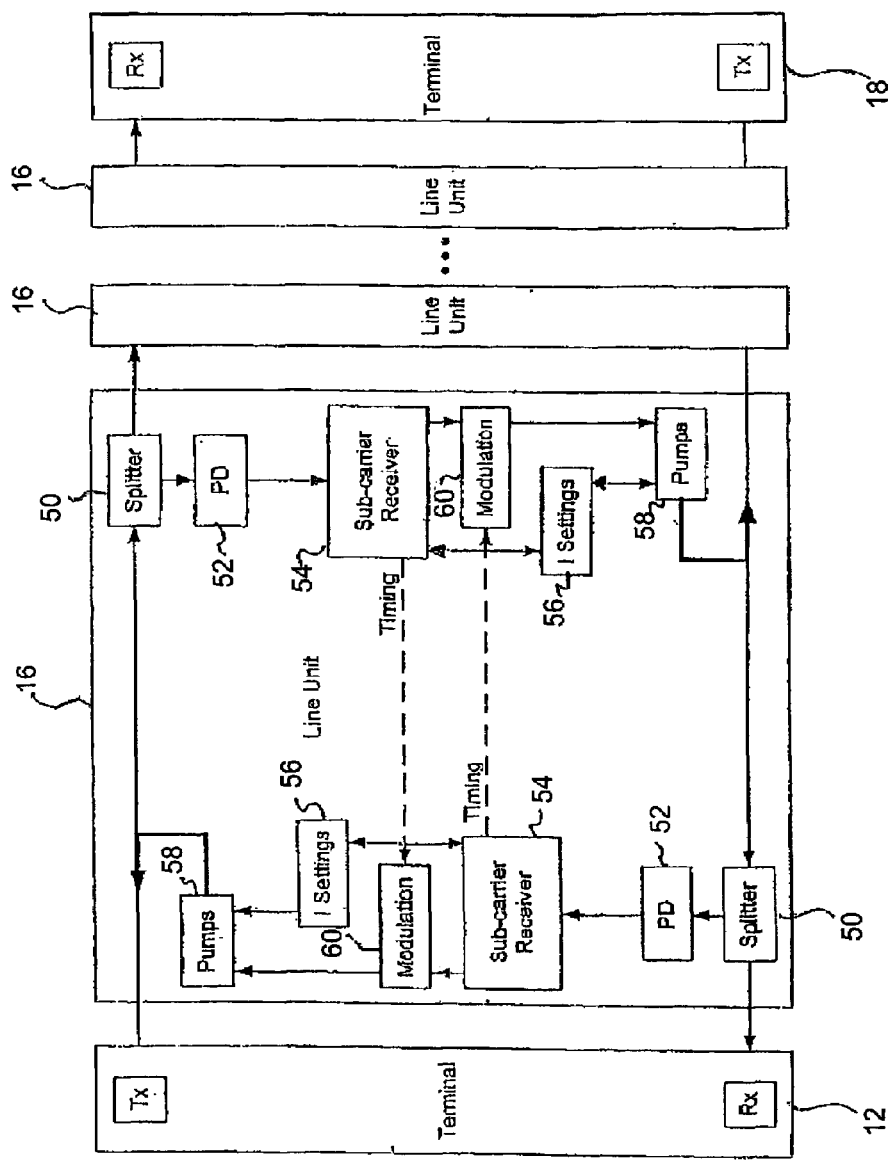
FIG. 5 is a block diagram of an exemplary repeater of an optical communication system in which the present invention can be implemented.

Functional blocks associated with an exemplary repeater 16 are depicted in FIG. 5. Therein, each fiber has a splitter 50 connected thereto to sample part of the traveling WDM data signal. The splitters 50 can, for example, be implemented as 2% couplers. A photodetector 52 receives the sampled optical signal from its respective splitter 50 and transforms the optical signal into a corresponding electrical signal. The photodetector 52 outputs the electrical signal to a corresponding sub-carrier receiver unit 54, which detects and decodes the commands present in the sub-carrier modulated monitoring signal that has been modulated on the envelope of the WDM data signal. Although this exemplary embodiment describes the transmission of supervisory information using a sub-carrier modulated onto the envelope of the WDM data signal, those skilled in the art will appreciate that other techniques can be employed to send supervisory data between terminals and repeaters, e.g., using a separate WDM channel for supervisory signaling.

After decoding the command, the particular sub-carrier receiver 54 determines whether the decoded command is intended for it. If so, the action in the command is executed, e.g., measuring the power of the WDM signal, measuring the pump power output from one or more lasers in the pump assembly, or changing the supply current to the lasers of the pump assembly. To this end, the sub-carrier receivers 54 are connected to respective current control and power monitoring units (I settings) 56, which each include pump power monitors and pump current controls for each laser in the associated pump laser assembly 58.

Figure 6:
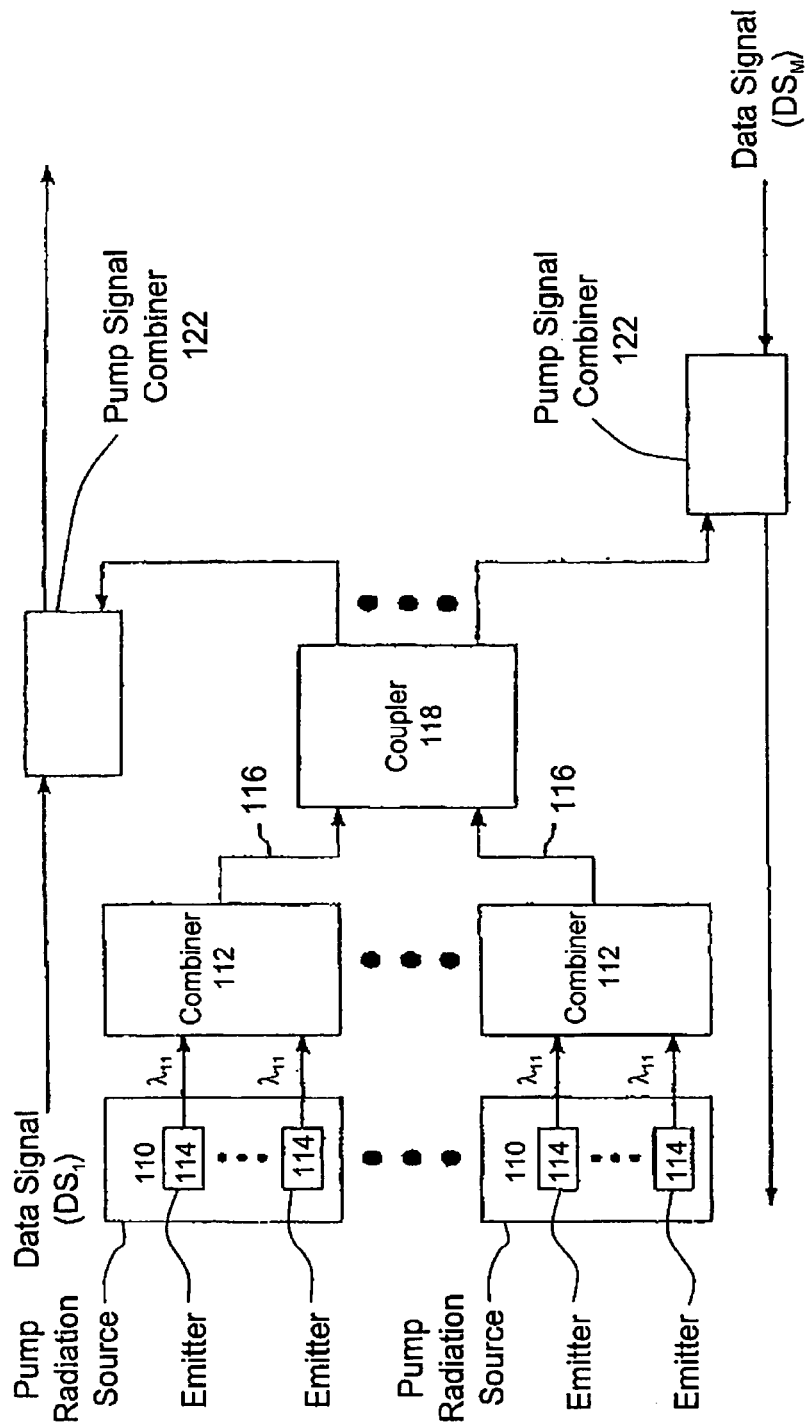
FIG. 6 is another block diagram of an exemplary repeater of an optical communication system including an exemplary Raman pumping architecture.

The pump modules 58 provide pump light into the optical fibers to amplify the data signals traveling therein using a Raman amplification scheme, as generally described above. The gain profile for a single pump wavelength has a typical bandwidth of about 20–30 nm. For high capacity WDM communication applications, such a bandwidth is too narrow and, accordingly, multiple pump wavelengths can be employed to broaden the gain profile. FIG. 6 depicts an exemplary pump architecture for providing multiple pump wavelengths in a Raman amplification scheme.

Therein, a number N of pump radiation sources 110 are optically coupled to a respective one of N pump radiation combiners 112. Each of the pump radiation sources 110 generate various pump wavelengths at various pump powers using individual radiation emitters 114. The individual radiation emitters 114 can, for example, be lasers, light emitting diodes, fiber lasers, fiber coupled microchip lasers, or semiconductor lasers. The combiners 112 combine the various outputs of their respective pump radiation sources, e.g., by wave division multiplexing, and outputs the combined optical pumping signal to coupler 118. Coupler 118 can be an N×M coupler which takes contributions from all N inputs to provide a representative output at each of M output ports. Energy from the coupler 118 is pumped into the optical fiber(s) via pump signal combiners 122. In general, Raman pump architectures couple the light generated by pump lasers at various wavelengths and various powers to the optical fibers to pump the optical data signals. Those skilled in the art will appreciate that many other types of pumping architectures can be employed to provide Raman amplification to optical data signals in accordance with the repeater structures described below.

Figure 7A:
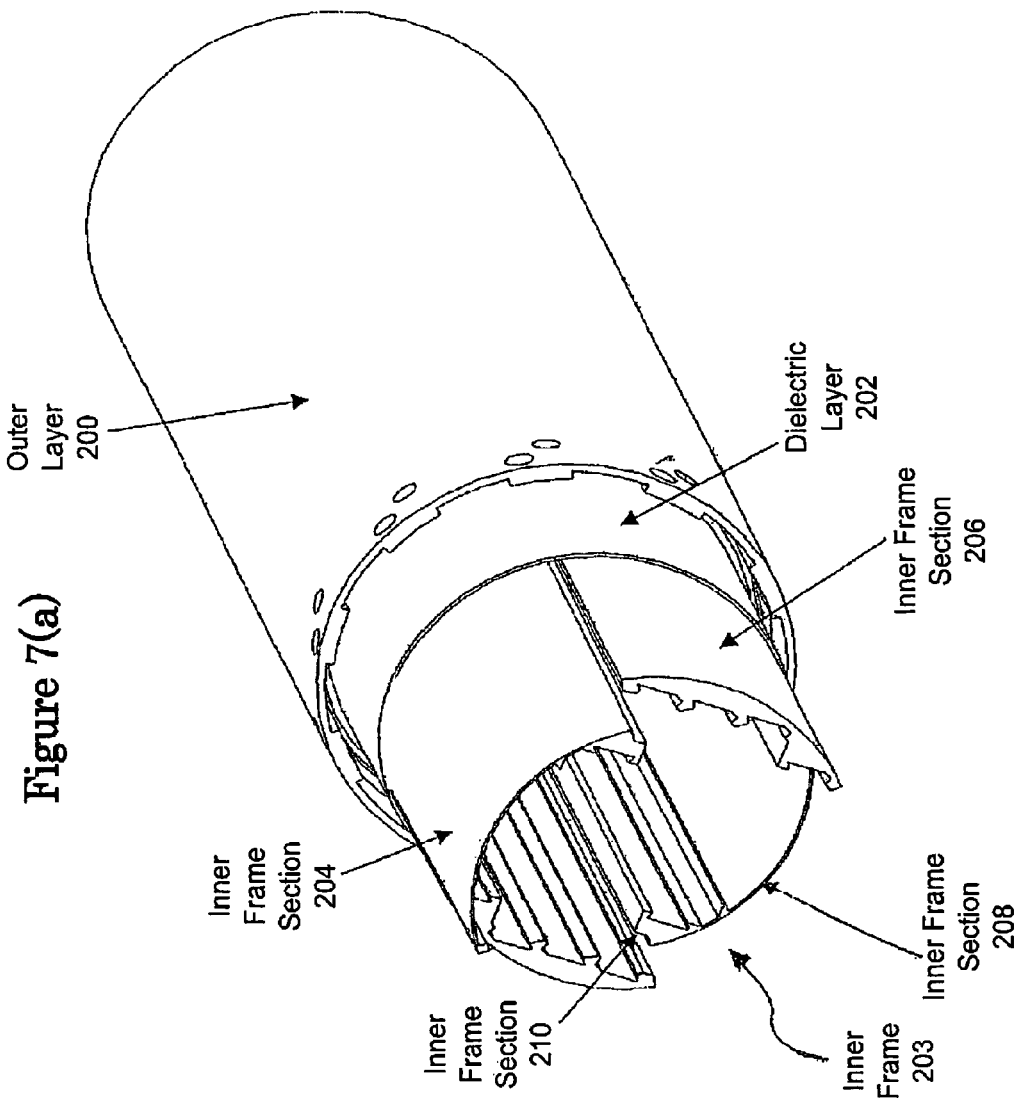
FIGS. 7(a) and 7(b) depict the various shell layers associated with repeaters according to exemplary embodiments of the present invention.

FIG. 7(a) illustrates the general shell structure of a repeater 16 according to the present invention from a layered perspective. Specifically, the outer layer 200 is part of the pressure vessel that protects the interior structure and optical/electrical components from a multitude of stresses, both before and after deployment underwater. Desirable physical characteristics for the pressure vessel include high strength, good resistance to corrosion and good thermal conductivity, i.e., to aid in minimizing temperature rises within the repeater due to heat dissipation. This latter characteristic of repeaters according to the present invention is emphasized in a number of features described below to aid in maintaining high performance of the lasers operating therein. For example, the pressure vessel can be fabricated from beryllium-copper alloys (e.g., 1.9% Be), although any materials having the aforementioned characteristics can be used. Pressure vessels according to the present invention can, for example, be approximately 1200 mm long, have an outer diameter of about 380 mm and a wall thickness of about 30 mm.

Inside of the pressure vessel layer 200 is a dielectric layer 202 that electrically insulates the pressure vessel from the optical/electrical components housed therein. Applicants anticipate that repeaters 16 operating in next generation, high power optical communication systems, e.g., Raman systems, may require more than 40 kV to be supplied thereto. Accordingly, the dielectric layer 202 should have a relatively high breakdown voltage while at the same time having a high thermal conductivity. Selection of an appropriate dielectric material given the need for high breakdown protection and thermal conductivity in repeaters according to the present invention is discussed in more detail below. The thickness of the dielectric layer 202 can, for example, be about 6 mm.

Figure 7B:
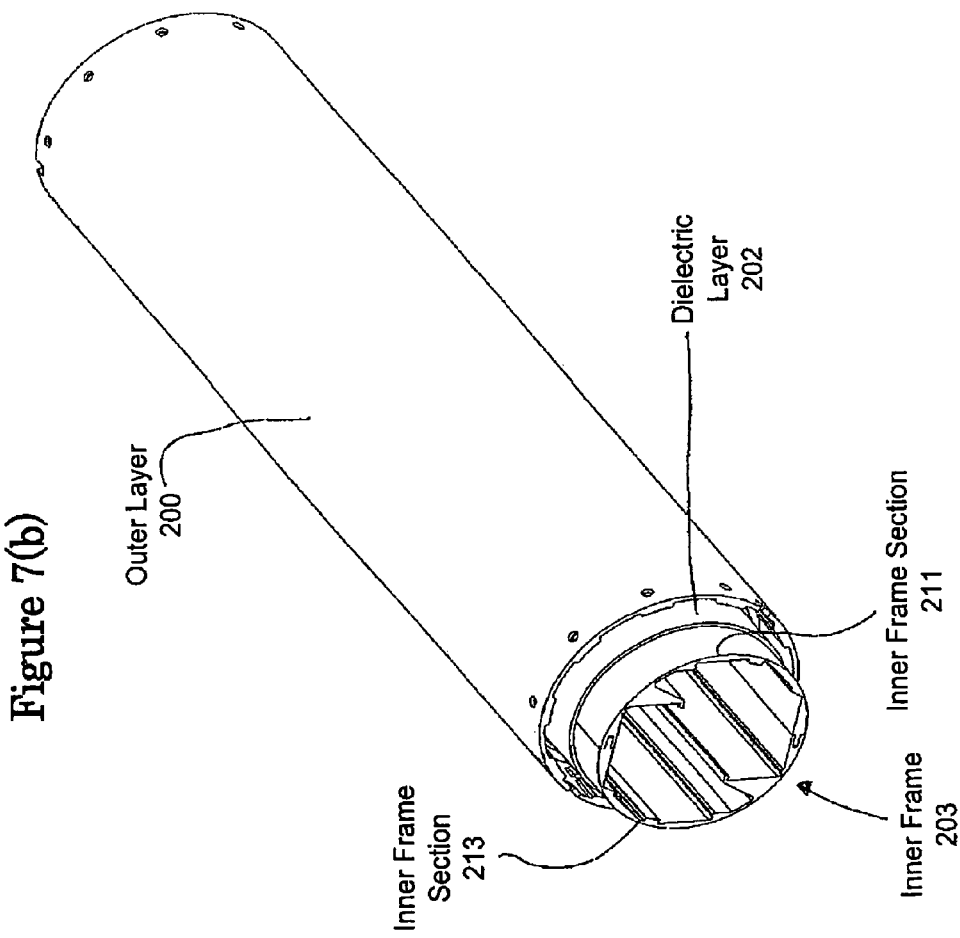
Figure 9A:
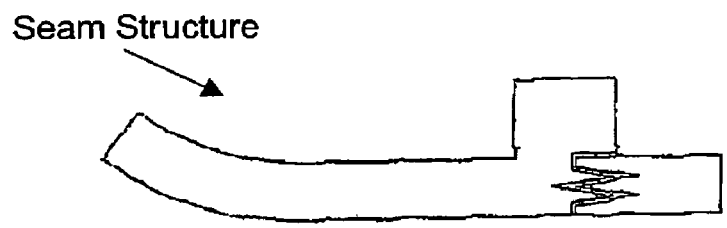
FIGS. 9(a)–9(e) depict various exemplary seams for dielectric layers according to exemplary embodiments of the present invention.
Figure 9B:
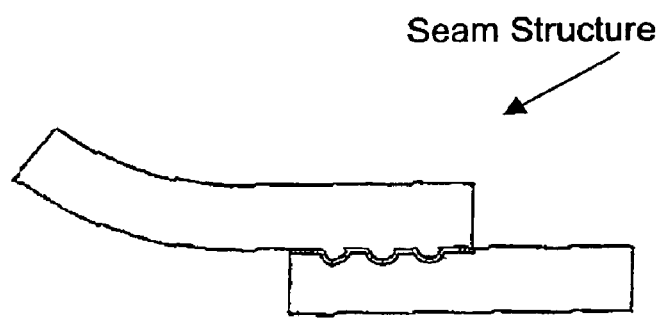
Figure 9C:
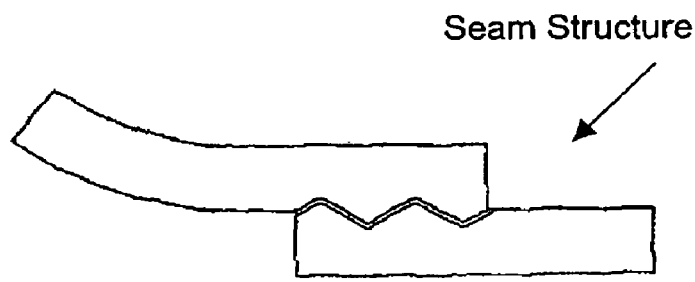
Figure 9D:
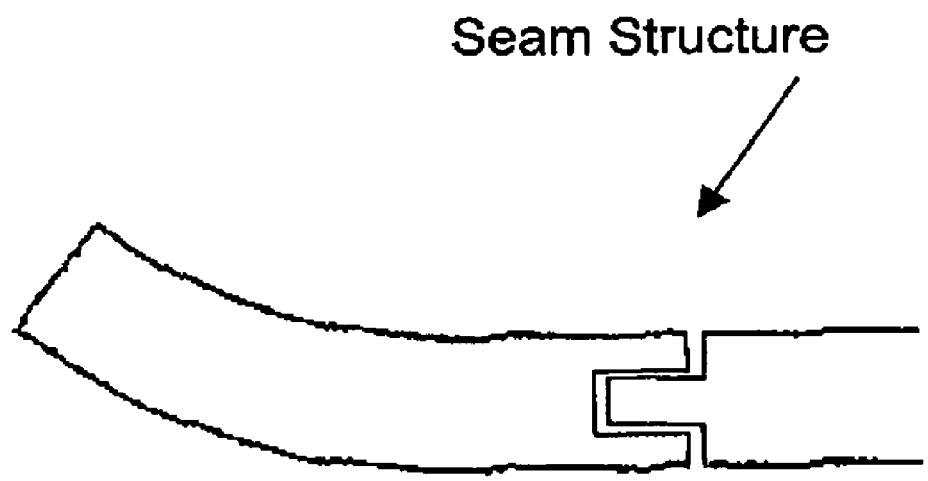
Figure 9E:
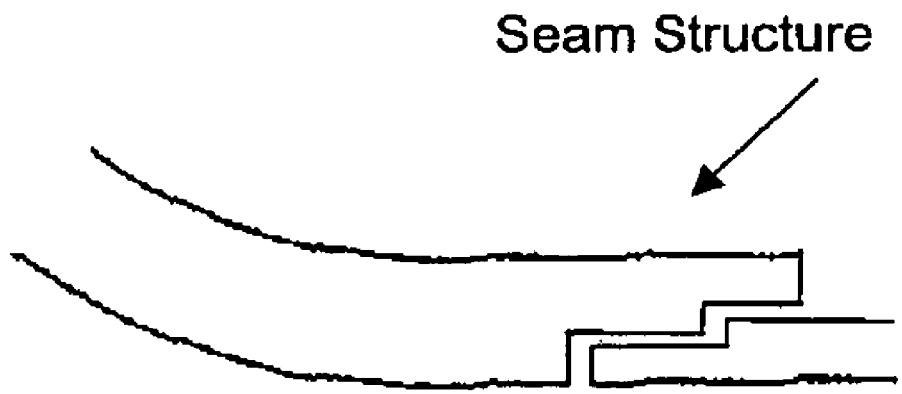

Inside of the dielectric layer 202, resides an inner frame structure 203. In the example of FIG. 7(a), this inner frame structure 203 is depicted in four sections 204, 206, 208 and 210. However, as described below, the number of elements which make up the frame structure is not particularly important and it can be fabricated from more or fewer than four elements. For example, as shown in FIG. 7(b), inner frame 203 is formed from two sections 211 and 213. If multiple elements are used for the inner frame structure 203, then those elements can be connected, e.g., using a tongue and groove mechanism as seen in FIG. 7(b). The inner frame structure 203 provides an area within which the optical/electrical components are mounted, the optical fiber is run and the various power connections are made. Several detailed examples of suitable mounting assemblies will be described below.

Having provided an overview as to the various layers found in repeaters 16 according to the present invention, various features of the present invention that enable repeaters to perform high power optical communication according to the present invention will be discussed individually below.

Referring now to FIG. 8, an exemplary pressure vessel assembly according to an exemplary embodiment of the present invention is depicted in an exploded view. Therein, various components that are used to removably seal one end of the pressure vessel 200 can be seen. The elements shown therein are designed to seal the interior of the pressure vessel 200 against water, while at the same time provide an entry/exit for the power cable and optical fibers (not shown in this figure). The pressure vessel assembly includes a C-ring 210, a pressure vessel endcap 212 with at least one gasket 214, a breech ring 216 having engagement elements 230, a bell housing 218 having engagement elements 236 and a gimbal 220. For more details regarding an exemplary pressure vessel which can be used in conjunction with repeaters according to the present invention, to interested reader is directed to commonly assigned, copending U.S. patent application Ser. No. 09969152, entitled "Repeaters with Pressure Vessels Having Breech Joints", to Perry Pitrone et al., filed on an even date herewith, the disclosure of which is incorporated here by reference.

As mentioned above, a dielectric layer 202 can be inserted between the pressure vessel 200 and inner frame structure 203 to protect the optical/electrical circuitry held in the frame structure against the very large amount of power carried by the power cable to supply each of the repeaters 16. Applicants believe that, depending upon the length of the system, distance between repeaters, power consumption of each repeater and other design variables, it will be desirable to provide more than 40 kV, possibly as much as 50–60 kV, to the power cable. Accordingly, with a safety margin of, for example, 50% it will be desirable to provide a dielectric layer 202 that has a breakdown voltage of greater than 40 kV and, more preferably greater than 75 kV, to protect the components held in the inner frame structure 203.

However, the dielectric layer 202 should also have certain other characteristics. For example, the dielectric layer 202 should fit within an allocated volume. As mentioned above, volume within the repeaters 16 is at a premium given the competing desires of maintaining a fixed repeater size and providing sufficient optical and electrical components to provide Raman-amplification across a very wide bandwidth (i.e., on the order of 100 nm). For this exemplary embodiment, the space allocation for the dielectric layer is approximately 6 mm, however those skilled in the art will appreciate that such an allocation may increase or decrease based upon specific applications. Another desirable characteristic of the dielectric layer 202 is that it should minimize the temperature rise across the material, i.e., it should be a good thermal conductor rather than a strong insulator. Preferably, the thermal conductivity of the dielectric layer should be greater than 1.5 W/mK. Again, this feature of the present invention addresses the issue of the large amount of heat that needs to be dissipated due to the high power of repeaters 16.

Additionally, it may be useful if the dielectric layer 202 has sufficient elasticity to absorb a certain amount of pressure vessel deflection when the repeater is deployed. Under certain conditions, the pressure on the pressure vessel 200 may be sufficient to deflect the pressure vessel inwardly, e.g., on the order of 0.75 mm. Although such deflection may not be problematic, the selection of the material for the dielectric layer 202 may optionally address this design consideration. Moreover, it is desirable that the dielectric layer be non-hygroscopic, e.g., have a water absorption characteristic of less than 0.1%. Lastly, the selected dielectric layer 202 should also be easy to manufacture and assemble with the other components of the repeater 16.

Given these considerations, Applicants have studied a number of different materials and fabrication methods for the dielectric layer 202 which are sorted by category in the table below.

TABLE 1

| Materials | Fabrication Methods | | |
|---|---|---|---|
| | Layering or Wrapping of Sheet Material | Mold In Situ, Cast Inside Pressure Vessel | Pre-molded, extruded or injection molded |
| Polymers/Thermoplastics | No | No | Yes |
| Elastomers/Polyurethanes | Yes | Yes | No |
| Epoxy-resin mixtures | No | Yes | No |
| Gap Filling Products | No | Yes | No |

Considering each fabrication method in turn, wrapping the repeater frame 203 with the dielectric material taken from a sheet or roll can be accomplished by cutting a selected material to size and then either bonding the sized material to the inner diameter of the pressure vessel 200 or bonding the sized material to the outer diameter of the frame structure 203. Those skilled in the art will appreciate that employing sheet or roll material to provide dielectric layer 202 may involve one or more layers of the material being applied in practice depending upon the breakdown voltage/mm and other characteristics of the material. If a single layer is used, then the structure of the seam between the ends of the layer should be designed to reduce voltage creepage. Exemplary seam structures for dielectric layer 202 when fabricated using sheet or roll material are illustrated as FIGS. 9(*a*)–9(*e*). Therein, it can be seen that various types of overlap are provided to reduce voltage creep and preserve the dielectric breakdown properties of the layer as a whole. Exemplary material candidates in this category include Furon TC-100 and TC-2000 series materials, Chomerics F-174 material, Berquist Gap Pad 3000 material and Fujipoly GR material.

The dielectric layer 202 can also be fabricated by molding a suitable material in situ. For example, a liquid resin cast can be provided inside the pressure vessel 200 for molding dielectric layer 202. Exemplary materials for in situ molding of the dielectric layer 202 include Cotronics and Conap materials with or without boron nitride fillers (which increase dielectric and thermal performance) and Berquist Gap Filler 2000 material.

Figure 10A:
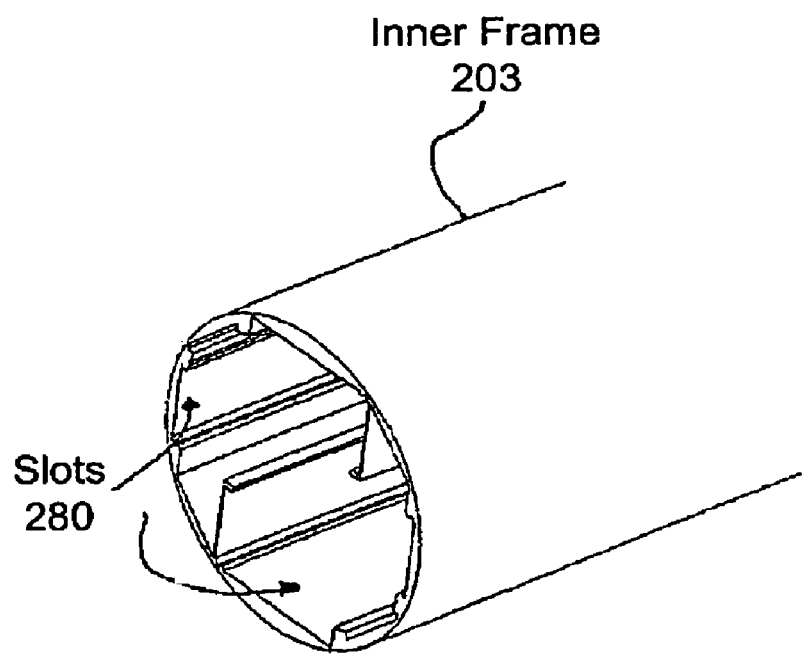
FIGS. 10(a)–10(b) depict an exemplary repeater inner frame structure fabricated from a dielectric material according to an exemplary embodiment of the present invention.
Figure 10B:
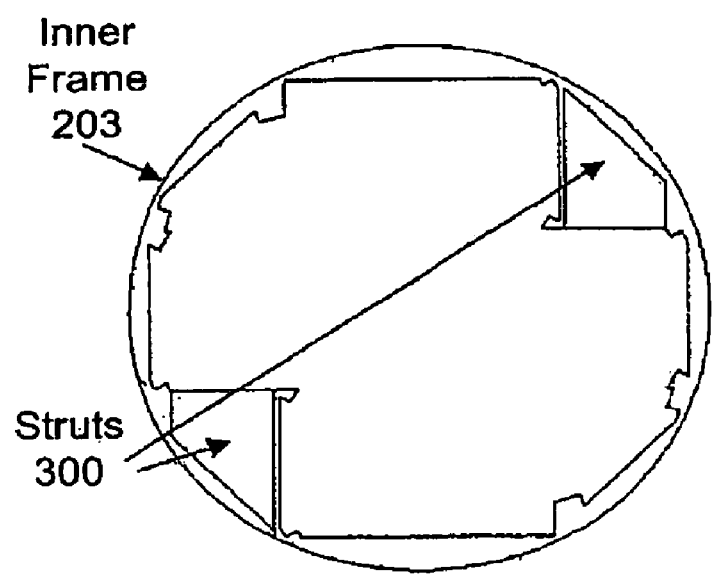

Another way to provide the dielectric layer 202 is to combine that layer with the inner frame structure 203, i.e., by forming the inner frame structure 203 from a dielectric material that protects the optical and electrical components secured thereto. An exemplary inner frame structure 203 fabricated from a dielectric is illustrated in FIGS. 10(*a*) and 10(*b*). Therein, it can be seen that the slots 280 for receiving the line quad assemblies (not shown here, described in more detail below) are fabricated directly into the dielectric material. Additonally, since the dielectric material of the inner frame 203 in FIGS. 10(*a*) and 10(*b*) will not be as thermally conductive as an inner frame structure fabricated from a metal, conductive struts 300 can be provided in this embodiment to conduct heat generated by the optical and electrical components to the pressure vessel 200. The dielectric inner frame 203 according to these exemplary embodiments can be made as a single part by extrusion, thermoforming or injection molding. The resulting structure can then be inserted into the pressure vessel 200 and bonded thereto. Exemplary materials which are suitable for fabricating a dielectric inner frame structure for repeaters 16 according to the present invention include polymers D2 and RS012 available from Cool Polymers. Such materials exhibit good dielectric and thermal performance (e.g., 30.3 kV/mm and 0.12 degrees C., respectively).

The inner frame structure 203 secures the optical and electrical components that perform amplification and other functions (e.g., line monitoring) within the pressure vessel 200. According to exemplary embodiments of the present invention, these optical and electrical components have a "line quad" architecture, which means that at least some of the components associated with providing the optical signal processing functionality for two optical fiber pairs (i.e., two optical fibers carrying optical signal data in the direction from terminal 12 to terminal 18 and two optical fibers carrying optical signal data in the direction from terminal 18 to terminal 12) are shared (either actively or redundantly) and that, therefore, electrical and fiber optic connections are made between each of the line assemblies. The sharing of components between line assemblies is a significant benefit attributable to repeater designs according to the present invention, which features are described in more detail below.

Figure 11:
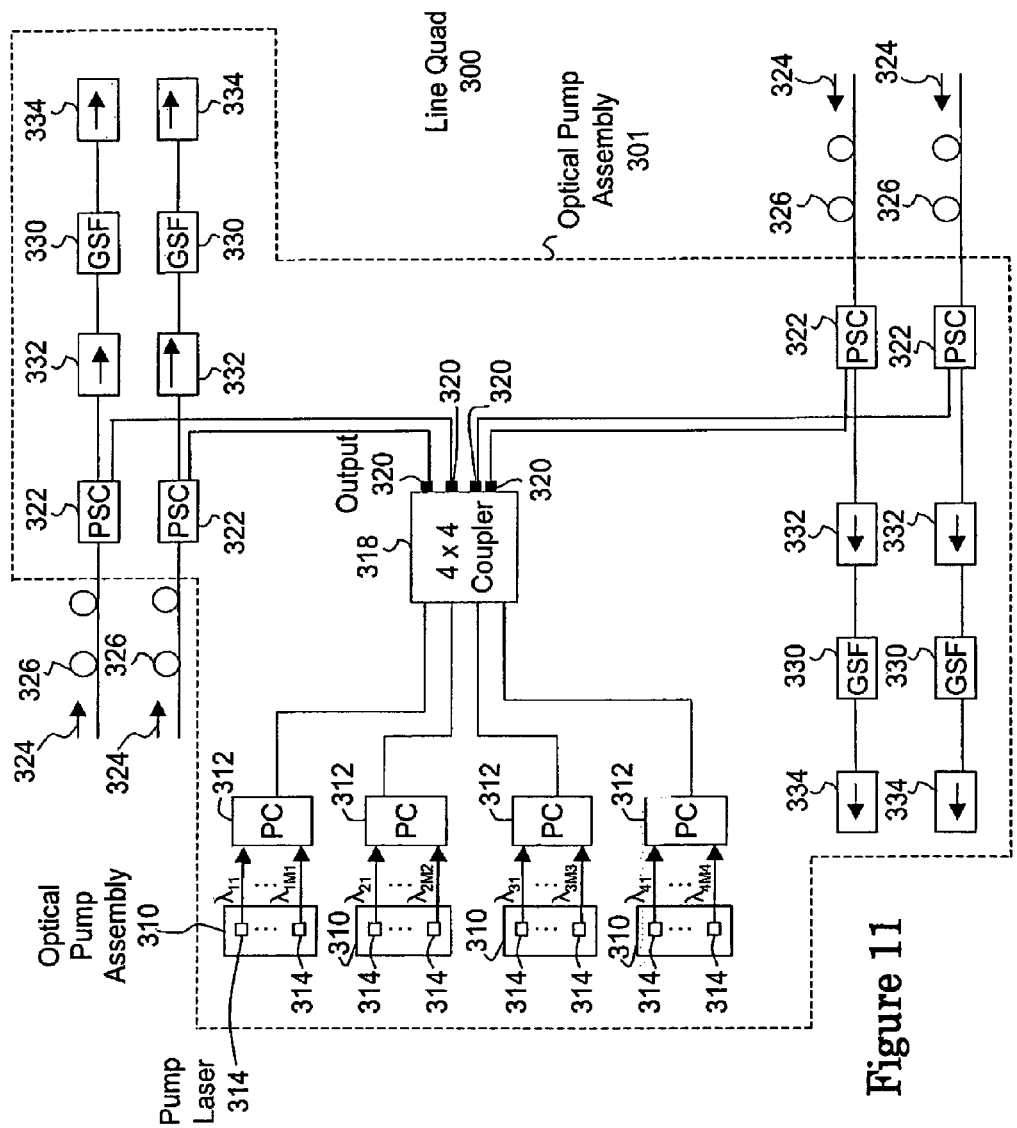
FIG. 11 shows an exemplary optical architecture which can be employed by repeaters according to an exemplary embodiment of the present invention.

An exemplary line quad assembly optical schematic is provided as FIG. 11. Therein, line quad 300 includes optical pump assembly 301 (shown enclosed by dashed lines) and transmission fiber 326. The optical pump assembly 301 in this exemplary embodiment includes four contrapropagating (backward) pump radiation sources 310 optically coupled to respective pump combiner assemblies 312, each of which can be disposed on a line assembly (described below with respect to FIG. 13. Each of the pump radiation sources 310 has a set of wavelengths $\lambda_{i1}$ to $\lambda_{imj}$, where i designates the ith pump radiation source, and mi is the number of wavelengths generated by the ith pump radiation source. For example, each pump radiation source 310 can employ 10, 12 or 14 backward pump lasers 314. Each pair of pump lasers may be set to provide pump energy at a different pump wavelength and pump power so as to provide a desired overall gain profile to the optical data signal being amplified by each repeater 16. As a purely illustrative example for repeater 16 employing pump radiation sources 310 each having 10 backward pump lasers (20 laser pairs) 314, the wavelength/optical output power can be selected as set forth in Table 2 below.

TABLE 2

| Laser Pair | Wavelength (nm) | Power/LP (mW) |
|---|---|---|
| 1 | 1409.50 | 45.10 |
| 2 | 1415.50 | 45.10 |
| 3 | 1426.50 | 38.00 |
| 4 | 1439.50 | 43.20 |
| 5 | 1465.00 | 39.00 |
| 6 | 1409.50 | 45.10 |
| 7 | 1418.50 | 43.30 |
| 8 | 1429.50 | 34.20 |
| 9 | 1443.50 | 40.70 |
| 10 | 1474.00 | 33.50 |
| 11 | 1409.50 | 45.40 |
| 12 | 1421.50 | 43.30 |
| 13 | 1429.50 | 34.20 |
| 14 | 1449.00 | 42.00 |
| 15 | 1498.00 | 18.20 |
| 16 | 1412.50 | 45.10 |
| 17 | 1424.50 | 43.30 |
| 18 | 1439.50 | 38.30 |
| 19 | 1457.00 | 42.00 |
| 20 | 1506.00 | 28.10 |

The paired pump lasers provide redundancy such that if one of the lasers in a particular laser pair becomes inoperative, then the output power of the remaining laser can be increased so that that the overall gain profile is not substantially affected. Between each pump laser 314 and its respective pump radiation combiner 312, a fiber Bragg grating (not shown) can be inserted as a wavelength locker that locks the radiation output from its associated laser 314 to the desired wavelength.

Each of the four pump radiation combiners 312 combines the radiation at the wavelengths of the set of wavelengths of its respective pump radiation source 310. Each pump radiation source 310 and corresponding pump radiation combiner 312 can be associated with a line assembly as described below. The combination of pump laser outputs within each line assembly can be accomplished in stages by providing a number of pump radiation combiner components within each unit 312. For example, each pair of pomp lasers 314 within a pump radiation source 310 can initially be combined using a pump beam combiner (not shown) component The pump beam combiners combine optical energy from each pair of pump lasers in a manner which depolarizes the resulting pump output. Various examples of techniques for combining the outputs of pump lasers to generated depolarized pump energy are described in co-pending, commonly assigned U.S. Provisional Patent Application Ser. No. 60/326451, entitled "Depolarizer for Multiplexed Arbitrarily Polarized Lasers", to Nandakumar Ramanujam et al., filed on an even date herewith, the disclosure of which is incorporated here by reference.

The outputs of pairs of pump beam combiners can then be combined by input to a pump wavelength combiner component (not shown), which process can be continued until all of the pump laser outputs within a line assembly are combined. Other examples of pump radiation combining can be found in co-pending, commonly assigned U.S. patent application Ser. No. 09838218, entitled "A Pump Assembly Employing Coupled Radiation Sources for Multiple Fibers", to William Shich et at, filed on Apr. 20, 2001, the disclosure of which is incorporated here by reference.

The four pump radiation combiner outputs are optically coupled to a 4×4 coupler 318, which combines the outputs of the various pump lasers from each of; in this example, four line assemblies. The 4×4 coupler 318 outputs a set of pump signals via the four coupler outputs 320 to be coupled with the optical data signals transmitted on each of the fibers 326. Because the 4×4 coupler 318 combines the coupled radiation profiles input into the 4×4 coupler, the output from each of the tour coupler outputs 320 has the spectral shape of the combined coupled radiation profiles. Therefore, each of the four pump radiation profiles has a contribution from all of the individual wavelengths of four pump radiation sources 310. This enables the pump lasers 316 on each line assembly to he shared among all four line assemblies in the line quad and to provide pumping power to all four of the optical fibers associated therewith.

Figure 12:
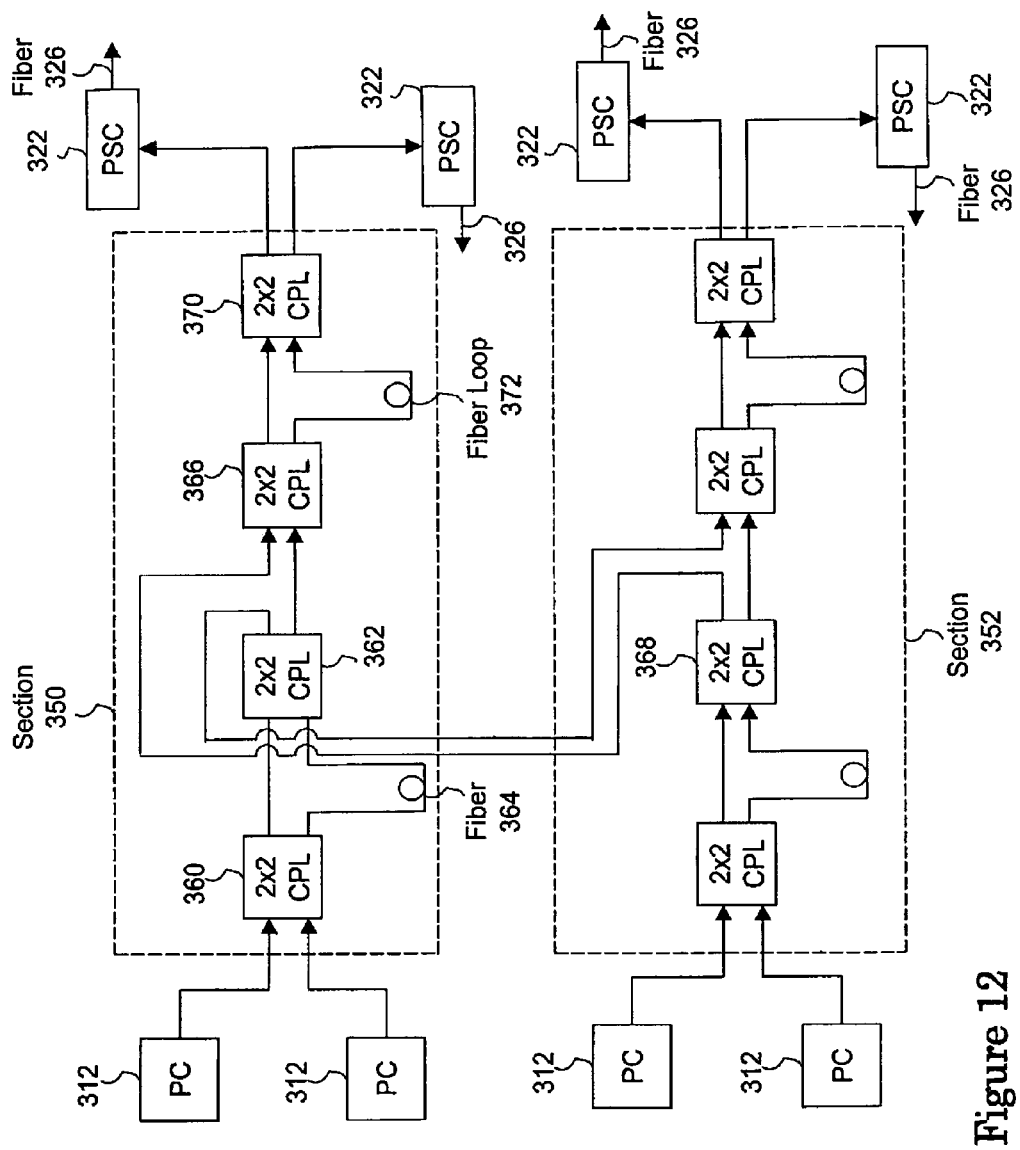
FIG. 12 illustrates a more detailed schematic of an exemplary 4×4 coupler which can be used in the optical architecture of FIG. 14.

An example of a balanced 4×4 coupler which can be used as 4×4 coupler 318 is provided in FIG. 12, however the interested reader is referred to co-pending, commonly assigned U.S. patent application Ser. No. 09969142, entitled "Balanced Coupler for Radiation Sources", to William Shich at al., filed on an even date herewith, the disclosure of which is incorporated here by reference, for more detail. In FIG. 12, it can be seen that the 4×4 coupler 318 can be implemented in two sections 350 and 352, each of which can be disposed within a different line assembly (described below). Since these two sections are identical, only section 350 is described herein. The outputs of two of the pump radiation combiner units 312 are input into a first 2×2 coupler 360, one of the outputs of 2×2 coupler 360 is passed directly to a second 2×2 coupler 362, while the other output is first passed through fiber section 364 (e.g., 10 m of single mode fiber). One of the outputs of 2×2 coupler 362 is passed to section 352 of the 4×4 coupler, while the other output is passed to 2×2 coupler 366. 2×2 coupler 366 accepts as its other input the corresponding feed from 2×2 coupler 368 of section 352. One output of 2×2 coupler stage 366 is passed directly to the final 2×2 coupler stage 370, while the other output of 2×2 coupler stage 366 is first passed through fiber loop 372 (e.g., 60 m of single mode fiber) prior to being input to 2×2 coupler 370. The two outputs of section 350 are passed to respective pump signal combiners 322 to couple the pump radiation energy with the fibers 326.

Specifically, an optical signal 324 propagates along a respective fiber 326 to a respective pump-signal combiner 322, where it is combined with a respective pump radiation profile. The pump radiation profile radiation counterpropagates with respect to a respective optical signal 324 and amplifies the signal 324 in the fiber 326. The pump assembly 301 also includes a number of other signal path processing devices, e.g., one or more gain shaping filters 330 and isolators 332 and 334.

The signal path processing devices may also include an additional coupler (not shown) for coupling a co-propagating pump radiation profile to the optical data signals 324. Co-propagating pump radiation can be used to amplify the optical data signal as it leaves a repeater 16 so that launch power can be reduced. If so-called forward pumping is employed in addition to or in place of contrapropagating (backward) pumping, then one or more co-propagating pump lasers can be added to one or more of the pump radiation sources 310. These co-propagating lasers can also be shared among the line assemblies as described, for example, in co-pending commonly assigned, U.S. patent application Ser. No. 09865440, entitled "Shared Forward Pumping in Coupled Line Pair Architecture", to Thomas Clark et al., filed on May 29, 2001, the disclosure of which is incorporated here by reference, and by providing a second 4×4 coupler (not shown) to combine the forward pump outputs from each of the line assemblies.

Figure 13:
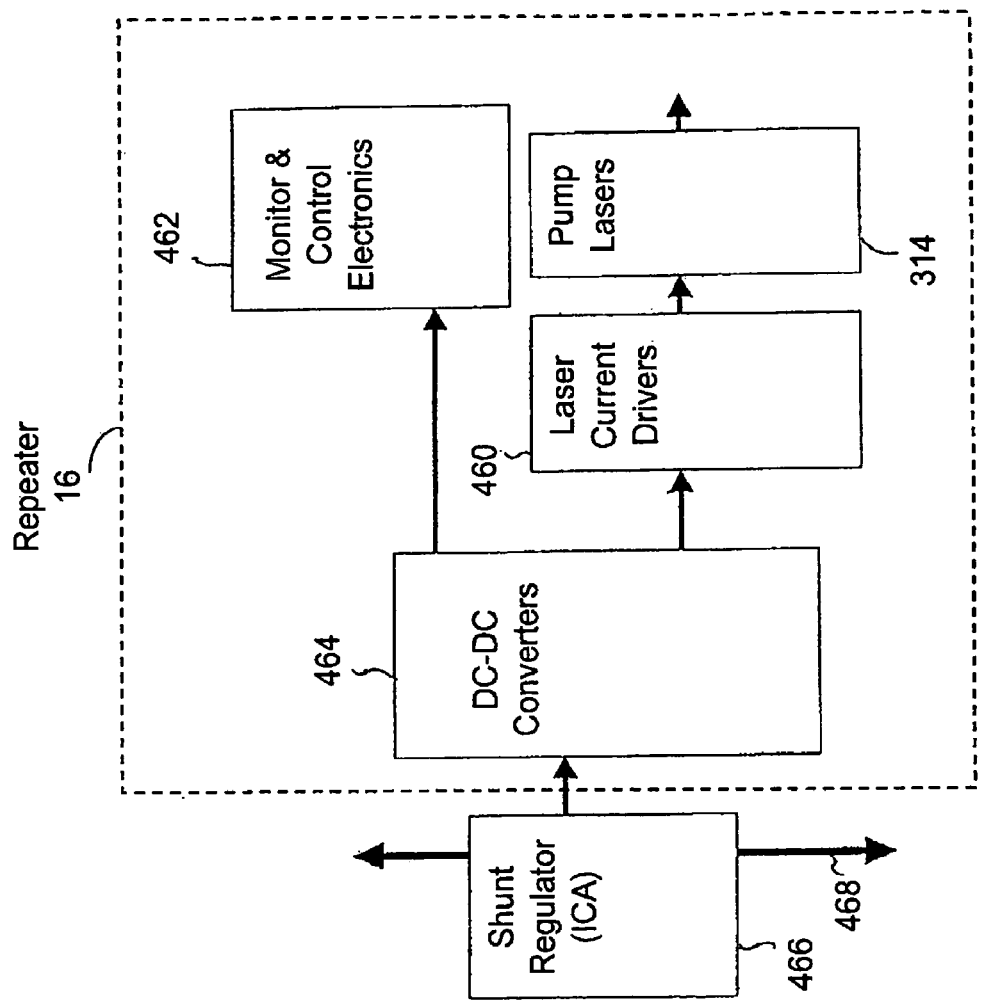
FIG. 13 depicts functional blocks of a repeater power distribution scheme according to one exemplary embodiment of the present invention.

As mentioned above, in addition to the pump lasers 314 themselves, the repeater also includes laser driver circuitry 460, monitoring and control circuitry 462, and power supply circuitry 464 as generally shown in FIG. 13. Therein, a shunt regulator 466 shunts a predetermined line voltage to a repeater 16 from power cable 468. DC-DC converters 464 downconvert the line voltage to a voltage usable by the monitor & control electronics 462 and laser current drivers 460. The monitoring and control circuitry 462 provides the capability for the terminals and repeaters to exchange maintenance and control information over a communication channel. This communication channel can be implemented by modulation of the communication envelope within which the high data rate WDM channels are carried or by providing a separate wavelength channel for this purpose. For more details regarding exemplary monitoring and control circuitry 462, the interested reader is referred to co-pending, commonly assigned U.S. patent application Ser. No. 09927439, entitled "Redundant Repeater Monitoring Architecture", to John Mellert et al., filed on Aug. 13, 2001, the disclosure of which is incorporated here by reference.

The monitoring and control circuitry 462 consumes a small percentage of the total power consumed by a high power repeater 16 according to the present invention. Together the pump lasers 314 and the laser current drivers 460 consume the majority of the repeater's power. The total power consumed by high power, Raman amplification repeaters according to the present invention will depend upon many variables including the number of pump lasers used in each repeater and the anticipated spacing between repeaters 16 in the optical communication system (generally, greater spacing requires greater pump power). Another consideration in the total repeater power budget is the manner in which the laser current drivers provide current to each pump laser pair. One possibility is to provide a fixed supply voltage from which each laser current driver provides each pump laser pair with sufficient drive current to generate a predetermined optical output power from the laser pair. This approach, however, is not the most power efficient approach, because each pump laser can require a different amount of drive current to generate the predetermined optical output power. This phenomenon, and exemplary laser current drive circuits for more efficiently providing drive current to the large number of pump lasers found in high power repeaters according to the present invention, are described in more detail in co-pending, commonly assigned U.S. patent application Ser. No. 09969154, entitled "Efficient Laser Current Drivers" to Ronald B. Johnson at al., filed on an even date herewith, the disclosure of which is incorporated here by reference. To summarize some of the results found in this patent application, Table 3 provides information regarding an exemplary 24 laser pair repeater intended to operate in a system having repeaters 16 spaced approximately 60 km apart.

TABLE 3

|  | FIXED DRIVER SUPPLY VOLTAGE | VARIABLE DRIVER SUPPLY VOLTAGE |
| --- | --- | --- |
| Line Current | 4 A | 4 A |
| Line Voltage | 200 V | 140 V |
| Shunt Regulator | ~8 W | ~8 W |
| DC-DC Conversion | ~157 W | ~77 W |
| Laser Drivers | ~219 W | ~67 W |
| Pump Lasers | ~380 W | ~380 W |
| Monitor & Control | ~29 W | ~29 W |
| Total Power | ~790 W | ~561 W |

Unlike conventional systems, repeaters 16 according to the present invention draw a very large amount of power due primarily to the number and output power of the pump lasers 314. However, as shown by the table above, efficient pump laser driver circuit designs can reduce the overall power consumption of a repeater significantly. Nonetheless Applicants believe that even with fewer than 24 laser pairs, reduced component redundancy and shorter distances between repeaters in a system, each repeater will still draw in excess of 250 Watts—a dramatic increase over conventional repeaters. Moreover, repeaters according to the present invention which include 24 or more laser pairs, significant component redundancy and/or are designed to be spaced more than 60 km apart, will likely draw more than 500 Watts and possibly more than 700 Watts each as evidenced by Table 3.

Figure 3:
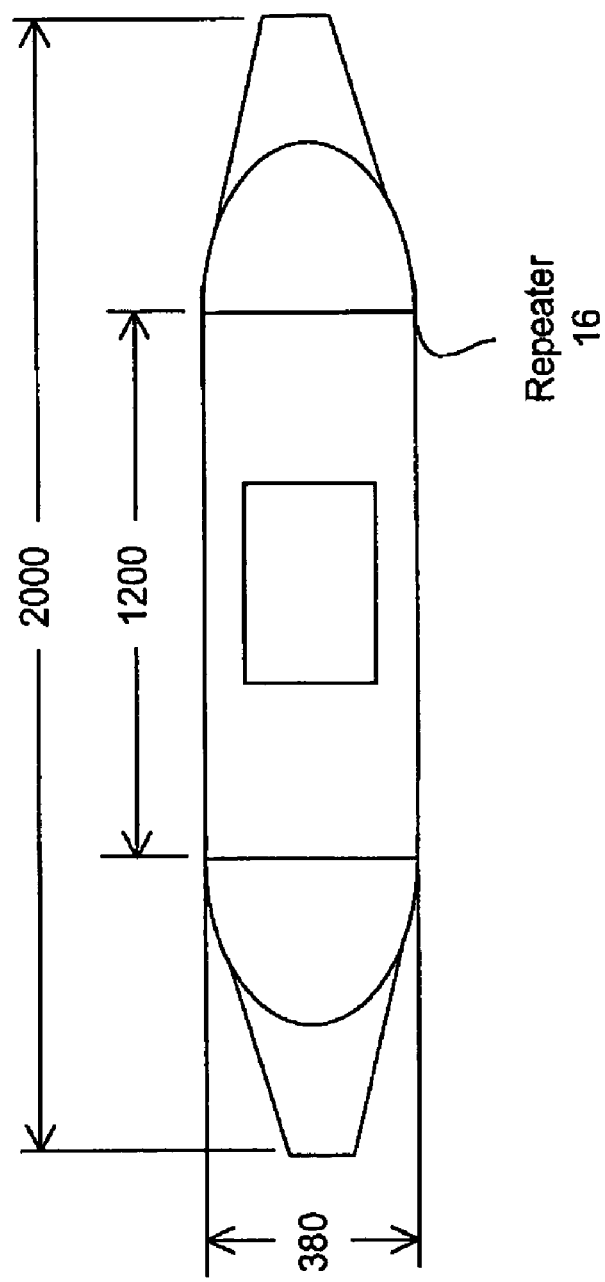
FIG. 3 is a depiction of a repeater showing dimensions thereof.

Given these exemplary optical and electronic schemes for Raman-amplified WDM repeaters according to the present invention, general design considerations associated with the mechanical aspects of line quad assemblies according to exemplary embodiments of the present invention include (1) minimizing temperature variances between ambient (e.g., sea water or sea floor) to the lasers and electronics in the line quad assmemblies, (2) providing physical packaging that permits a predetermined number of line quad asssemblies (e.g., 4) to be fit within a predetermined housing volume (e.g., as shown in FIG. 3), (3) providing flexibility for growh and changes in optical/electronic architecture, (4) providing a layout which facilitates manufacturing of repeaters according to the present invention and (5) providing a minimum fiber bend diameter, e.g., of at least 50 mm.

The challenge of providing a mechanical design which accomplishes these design objectives is multiplied by the number of components needed to implement the aforedescribed Raman amplification schemes. For example, depending upon the number of pump lasers employed to provide Raman gain to transmitted optical data signals, each line quad assembly can have 40, 48, 56, 64 or more lasers 314. There can be 120 or more passive optical components, e.g., pump radiation combiner 312 components, 4×4 coupler 318 components, pump signal combiners 322, gain shape filters 330, fiber bragg gratings, etc. A large amount of optical fiber (e.g., 1000–2000 m) is used to interconnect the pump lasers 314 and the passive optical components, which interconnectivity requires a large number of splices to be made between the optical fibers attached to each component. Additionally, space needs to be reserved within the packaging to wind up excess (slack) fiber between components. The line quad assemblies also need space for one or more power supplies, a backplane for electronic and power interconnection, laser current driver circuitry, monitoring and control circuitry.

These, and other, design considerations are accommodated by the exemplary structures described below and illustrated in FIGS. 14–24. Generally speaking each line assembly 400 according to this exemplary embodiment includes one pump radiation source 310 (or two if bidirectional pumping is employed), one pump radiation combiner 312, a portion of the 4×4 coupler 318 (or portions of two 4×4 couplers with forward pumping), one set of signal path components, e.g, pump signal combiner 322, gain shape filter 330 and isolators 332, 334, and associated drive, power, monitoring and control circuitry.

Figure 14:
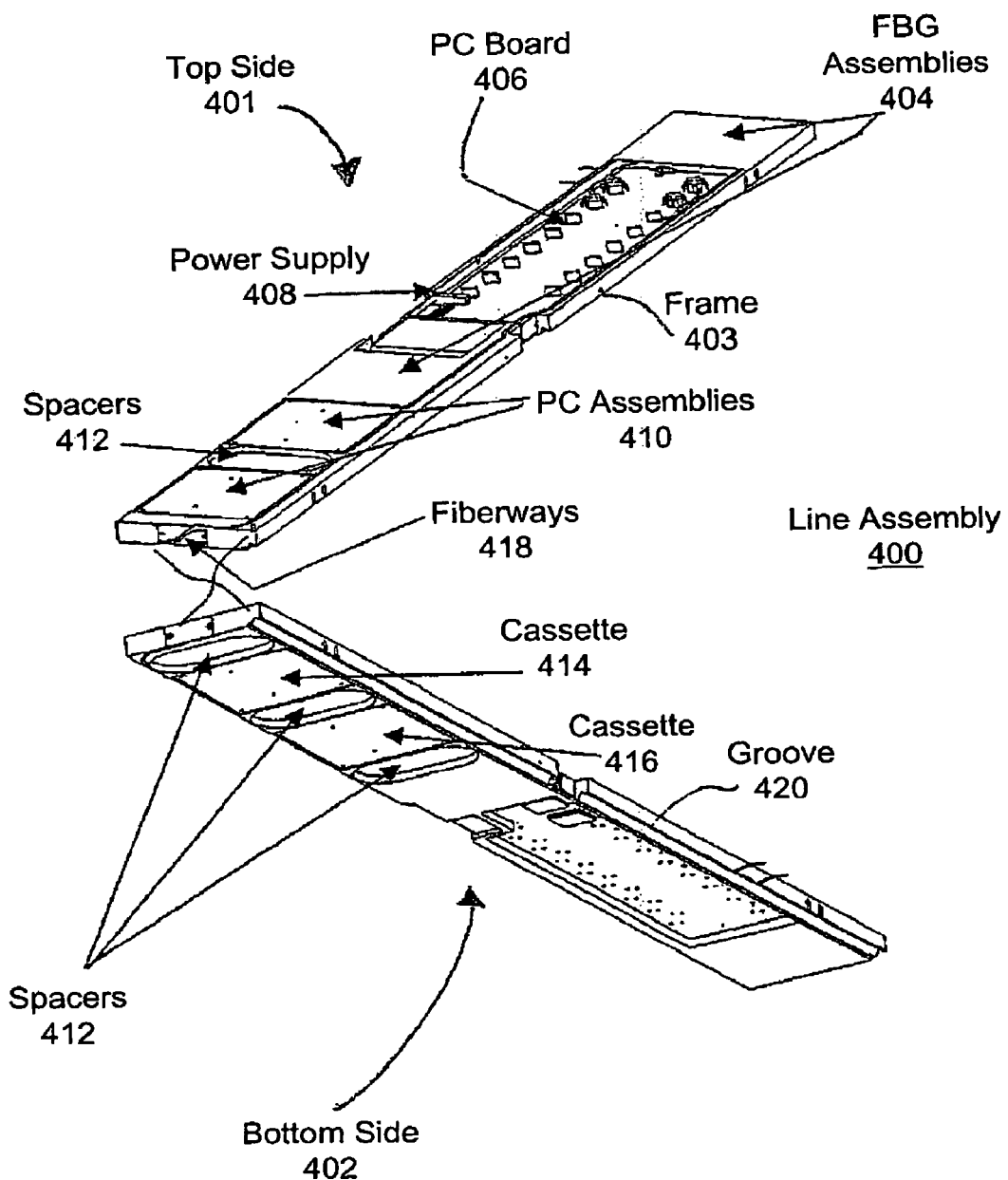
FIG. 14 shows a top and bottom view of a line assembly according to an exemplary embodiment of the present invention.
Figure 15:
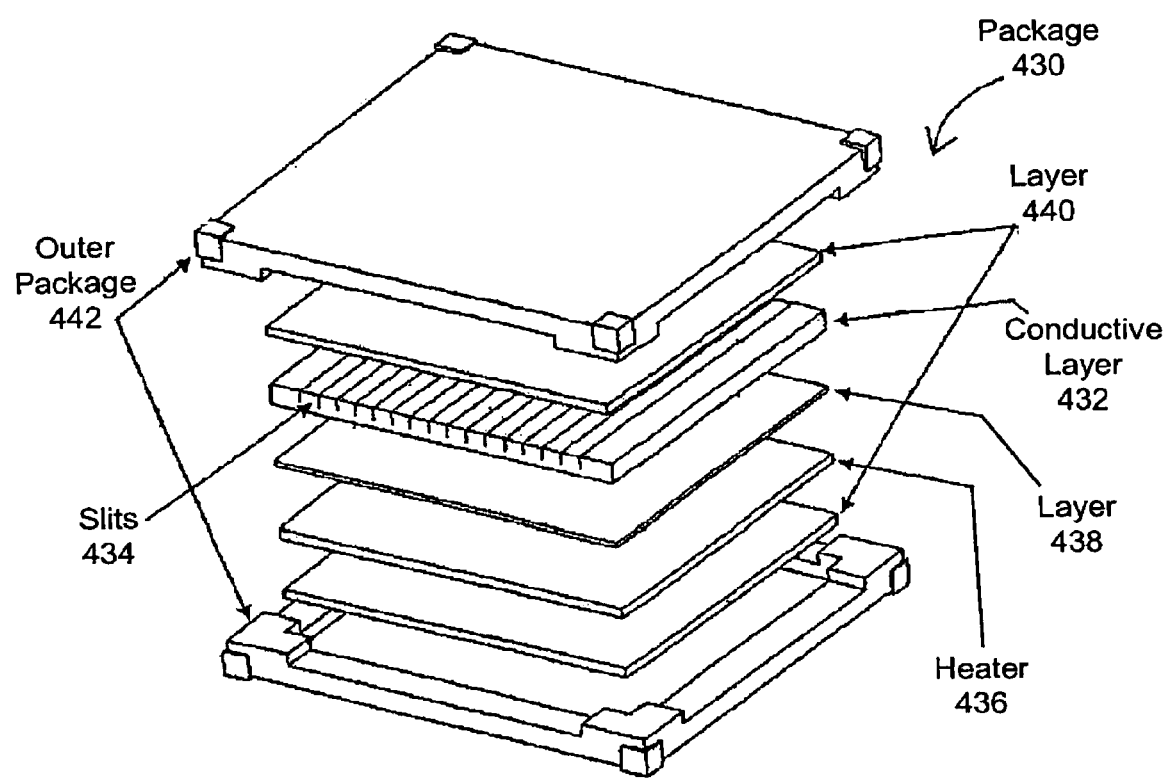
FIG. 15 depicts an optical package which can be used to house components employed by line assemblies according to exemplary embodiments of the present invention.

According to a first exemplary embodiment, each line assembly 400 is fabricated as a rectangular frame 403 having a number of component containing structures mounted thereon, as well as electrical and optical interconnects, as seen in FIG. 14. Initially an overview of the component containing strucutres in each line assembly will be provided, followed by more detailed information regarding each. Beginning with the top side 401, the line assembly 400 includes fiber bragg grating (FBG) containing assemblies 404, which may optionally have heating units associated therewith. These FBG assemblies 404 are used to contain the devices which act as wavelength lockers for each pump laser 314 as described above. The line assembly 400 also includes a printed circuit board 406 on which the pump lasers 314 are mounted and which carries the laser driver circuitry, as well as monitoring and control circuitry for the pump lasers. Each line assembly 400 farther includes space for a power supply (not shown) to power the pump lasers 314 and other circuitry. One power supply 408 can be shared among the four line assemblies 400 in each line quad, or multiple power supplies (e.g., one on each line assembly) can be provided for redundancy.

Pump combiner assemblies 410 contain the pump beam combiner components and pump wavelength combiner components associated with pump radiation combiners 312. Both the top side 401 and the bottom side 402 of a line assembly can include spaces 412 for winding and excess fiber associated with optical component interconnects. These spaces can he oval in shape to accommodate a "figure eight" winding pattern at the minimum fiber bend diameter. Moreover, the shape and size of the spaces 412 can he determined based upon the manufacturing technique selected for winding the excess fiber, e.g., a manual or automated process. One example of an automated tool for winding excess fiber is described in co-pending, commonly assigned U.S. patent application Ser. No 09927440, entitled "Automated Fiber Winding Device" , to Brent Pohl, filed on Aug. 13, 2001, the disclosure of which is incorporated here by reference. The bottom side 402 of line assembly 400 can also include a cassette 414 for holding the components and fiber associated with the signal path processing for the optical data fiber 324 associated with a particular line assembly 400. As mentioned above, this can include isolators 332 and 334, one or more gain shape filters 330, a pump signal combiner 322, as well as other components. A cassette 416 holds 4×4 coupler components associated with one section thereof (e.g., section 350 or 352 as described above) and the associated fiber. Fiber ways 418 are formed at the end of line assemblies 400 in order to provide a convenient routing mechanism for optical fibers which connect optical components mounted on sides 401 and 402 with one another.

Each line assembly also has a dovetail groove 420 formed on onside thereof, which groove is used for routing fiber and connection to the inner frame 203 as will be described below.

Having briefly described the packaging layout of an exemplary line assembly 400 according to the present invention, each of the component containing structures which are affixed to the line assembly frame will now be described in more detail. Beginning with the Fiber Bragg grating containers 404, various alternatives are possible. Since the wavelength locking functionality of Fiber Bragg gratings is temperature dependent, it may be necessary to provide a thermally controlled environment for these components. If so, the Fiber Bragg grating containers 404 can be fabricated as, or include, thermally controlled packages an example of which is provided in FIG. 15. Therein, the package 430 includes a thermally conductive layer 432, such as a conductive elastomer, that is used to mount the Fiber Bragg gratings. For example, slits 434 could be provided in the thermally conductive layer 432 for mounting the Fiber Bragg gratings. A temperature alteration device 436, e.g., a heating unit or a cooling unit, is arranged adjacent to the thermally conductive layer 432 and the Fiber Bragg gratings mounted thereon, so that the temperature alteration device 436 can control the ambient temperature around the components.

If the temperature alteration device 436 is a heater, then a heat spreading layer 438 is provided between the heater 436 and the thermally conductive layer 432 so that the heat generated by the heater 436 is evenly applied to the thermally conductive layer 432 and to the environment of the optical components mounted therein. If the temperature alteration device 436 is a cooling unit, then layer 438 is a conductor having high performance thermal conducting properties to conduct the heat away from the optical components. A controller (not shown) is also provided to control the heating and cooling provided by the temperature alteration device 436. Layer 440 is provided to encapsulate the thermally conductive layer 432 (with the optical components mounted thereon), the temperature alteration device 436, the controller, and the heat spreader 438, and may either be an insulator or a good thermal conductor depending upon whether the temperature alteration device 436 is a heater or a cooling unit, respectively. An external casing (or outer package) 442 can also be provided to encapsulate the remaining layers. For more details regarding exemplary Fiber Bragg component containers, interested readers are referred to co-pending, commonly assigned, U.S. patent application Ser. No. 09969030, entitled "Packaging Structure for Optical Components", to Lowell Seal at al., filed on an even date herewith, the disclosure of which is incorporated here by reference.

Figure 16:
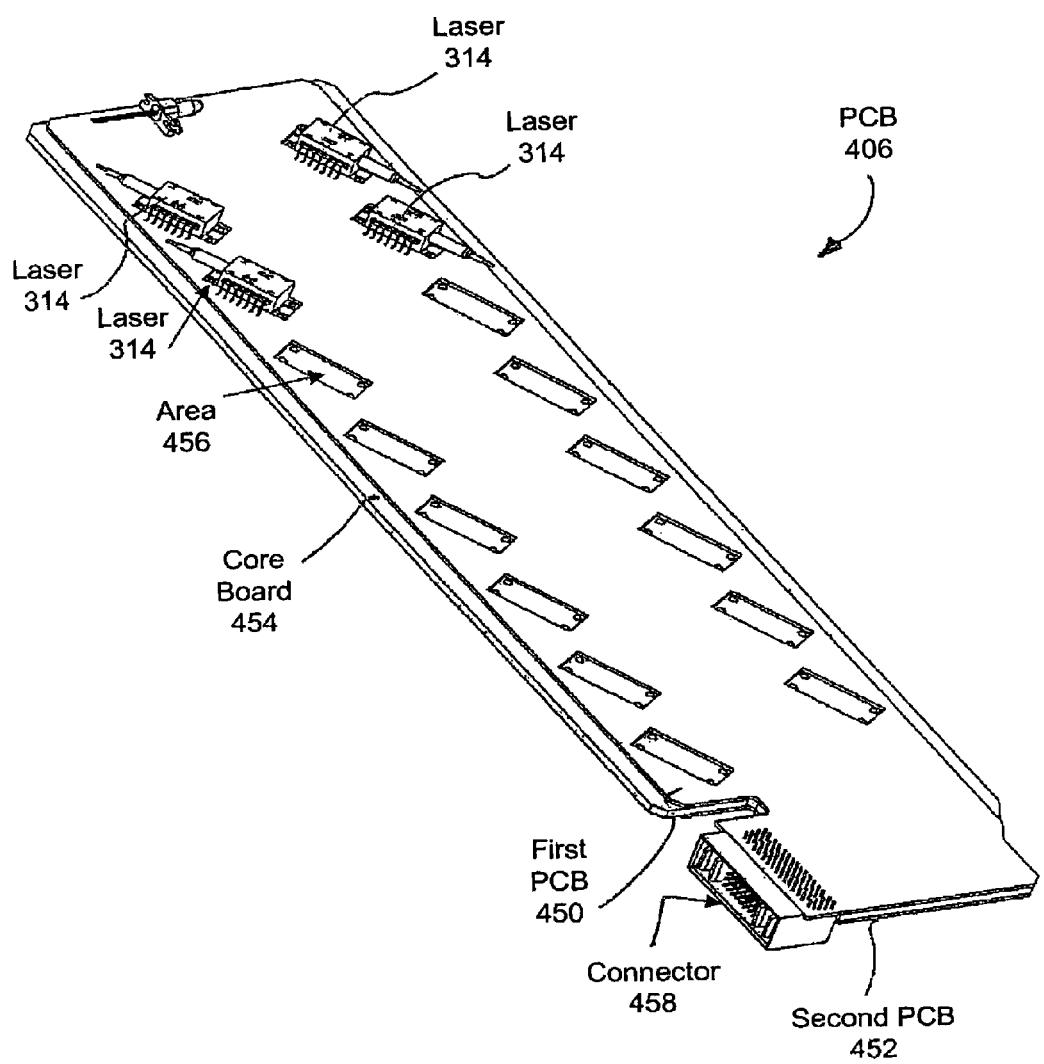
FIG. 16 shows a laser diode mounting assembly according to exemplary embodiments of the present invention.

An exemplary line assembly printed circuit board (PCB) 406 is illustrated in FIG. 16. Therein, it can be seen that the PCB 406 includes first and second PCBs 450 and 452 sandwiching a core board 454. The PCB 452 has openings formed therein which permit the lasers 314 to be directly mounted to the core board 454, which tapped for this purpose as seen in area 456. Core board 454 can, for example, be formed of 3–6 mm of copper and provides a mechanism for conducting the heat generated by the lasers 314 out to the pressure vessel 200. Although only four lasers 314 and sixteen areas 456 are illustrated as populating the PCB 452, those skilled in the art will appreciate that more or fewer lasers can be provided for therein depending upon the Raman pump design considerations described above. A hybrid signal connector 458 is also provided for conveying power and command signals to the circuitry provided thereon.

Figure 17:
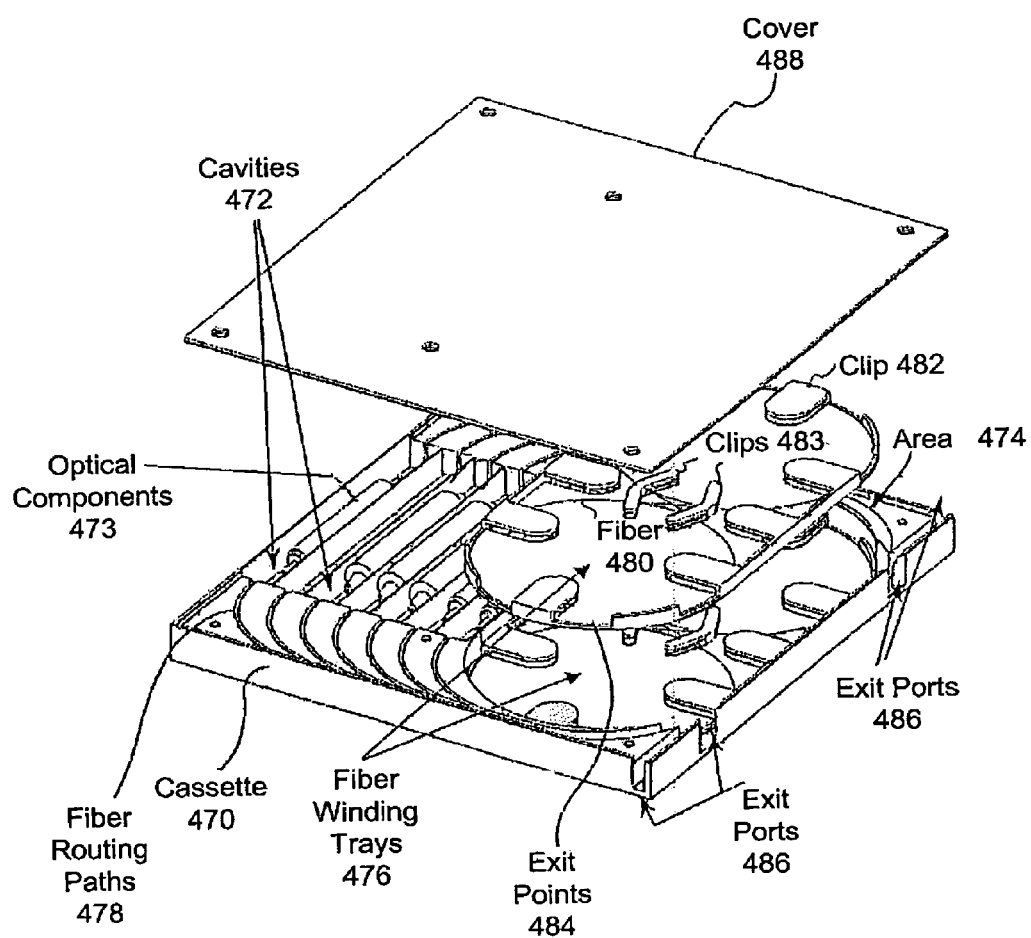
FIG. 17 shows another optical package which can be used to house components and optical fiber according to exemplary embodiments of the present invention.

Referring again to the line assembly 400, an exemplary optical fiber packing and containment container structure which can be used, for example, to hold the pump combiner assemblies 410, signal path component assemblies 414 and 4×4 coupler component assemblies 416, is illustrated in FIG. 17. This container enables excess optical fiber to be wound and stored in a thin structure which allows for multiple entry and exit points, eliminates torsional loading of the fiber and minimizes the volume needed for fiber storage (as compared to other devices). Those skilled in the art will appreciate that, in addition to those components mentioned above, containers according to this exemplary embodiment of the present invention, can also be used to manage various other types of opt-mechanical and electrical components.

In FIG. 17, cassette 470 includes a plurality of cavities 472 for holding optical components 473 and an area 474 for holding one or more stackable, fiber winding trays 476. Optical components 473 can be secured within each cavity 472 using, for example, clips or adhesives. Each cavity 472 has a pair of fiber routing openings that lead to fiber routing paths 478. The fiber routing paths 478 provide an easy mechanism for routing the individual optical fibers that connect each component to other components in the repeater 16. Excess fiber 480 which remains after splicing two of the optical components together can be wound on the stackable fiber winding trays 476.

By separating the optical fiber winding trays 476 from the discrete optical components, and providing plural trays, access is provided to rework the optical fiber (e.g., in the case that a splice needs to be redone) without disturbing the components and preserving the containment of the remaining optical fiber. Each fiber winding tray 476 has a plurality of fiber retaining clips 482 which retain the wound fiber 480 in the tray 476. Among other things, these retaining clips 482 minimize the adverse effects of vibration, shock and handling on the fiber. Clips 483 toward the center of the tray 476 permit the fiber 480 to be wound in a "FIG. 8" shape. This winding shape for excess fiber 480 is particularly advantageous because it avoids adding twists to the fiber, which twists would be induced by coiling the excess fiber using a circular or oval pattern. Cutouts 484 are also formed in each tray to provide exit points for the fiber 480. Providing a large number of exit points 484 permits manufacturing flexibility given the random length of excess fiber to be wound in tray 476 after splicing operation are performed. The fiber 480 can exit the cassette via any one of a number of exit ports 486. Once the components and fiber are secured within the tray 476, it can be closed by attaching cover 488 thereto, e.g., using screws. The completed cassette 470 can then be attached to the line assembly in its designated location.

Figure 18:
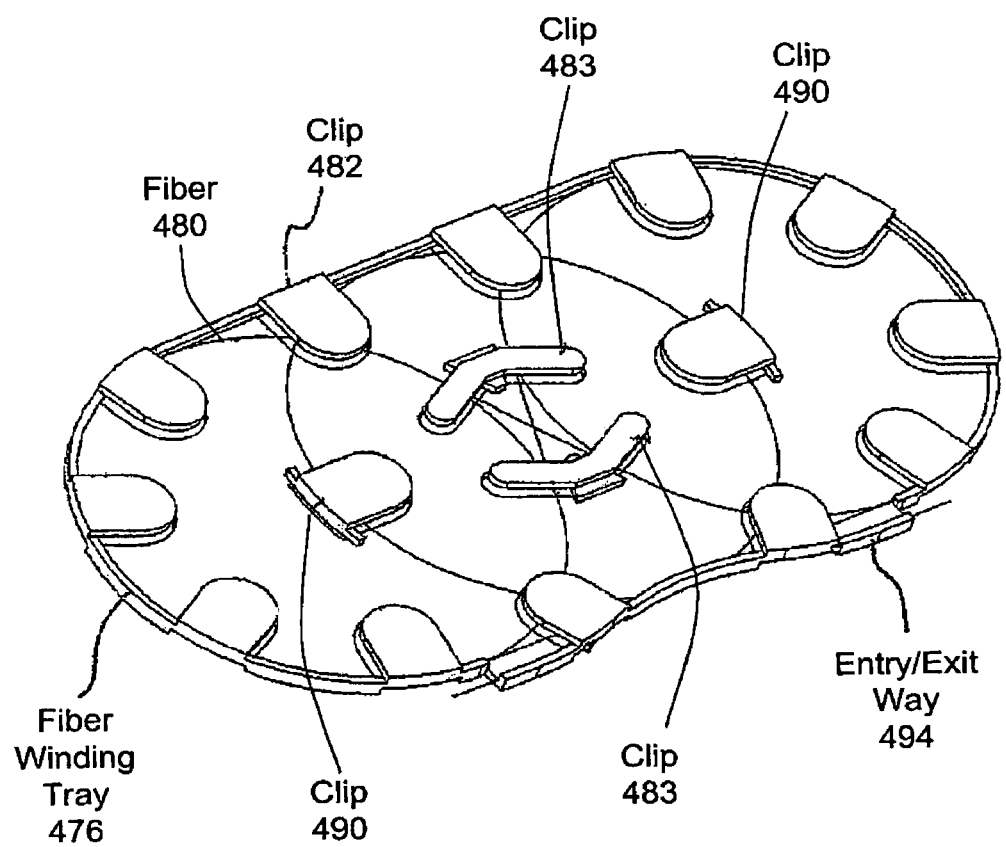
FIG. 18 shows an alternative fiber handling tray which can be used in conjunction with the optical package of FIG. 17.

Another exemplary embodiment of fiber winding tray 476 is depicted in FIG. 18. Therein, the fiber winding tray 476 has more fiber retaining clips 483 than the fiber winding tray of FIG. 20, as well as two additional center clips 490. The additional center clips 490 permit the winding of two overlapping figure 8's in the winding tray 476. The fiber winding tray 476 of FIG. 18 also has an entry/exit way 494 through which fiber enters and leaves the fiber winding tray 476 as opposed to cutouts 484. This feature reduces torsional loading on the optical fiber, particularly while handling multiple trays 476.

Figure 19:
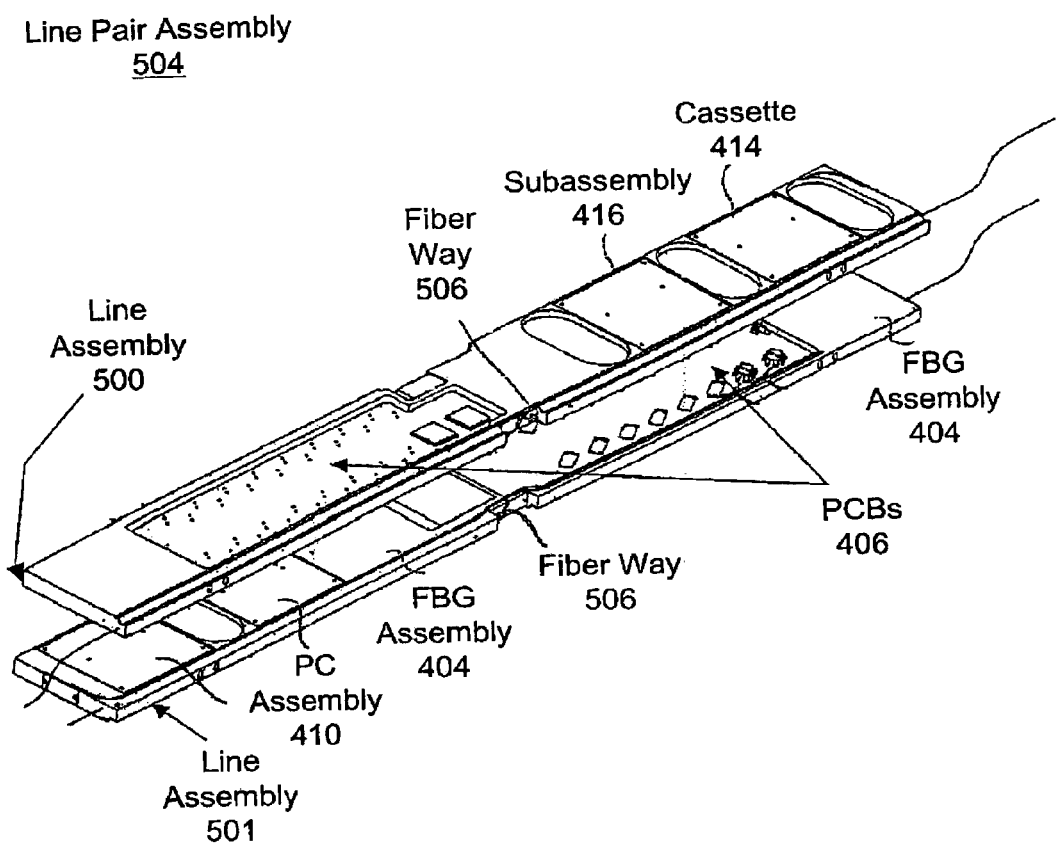
FIG. 19 depicts the mounting arrangement of two line assemblies into a line pair assembly according to an exemplary embodiment of the present invention.
Figure 20:
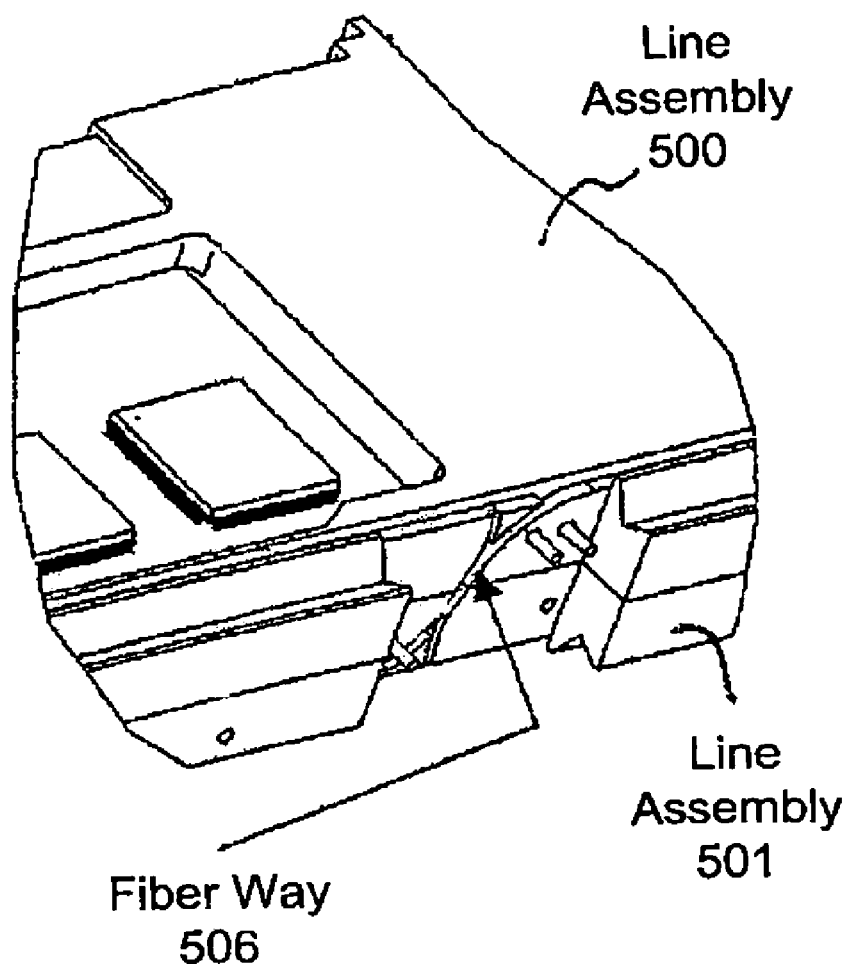
FIG. 20 is a cutaway portion illustrating the fiber ways between line assemblies in a line pair assembly according to exemplary embodiments of the present invention.
Figure 21:
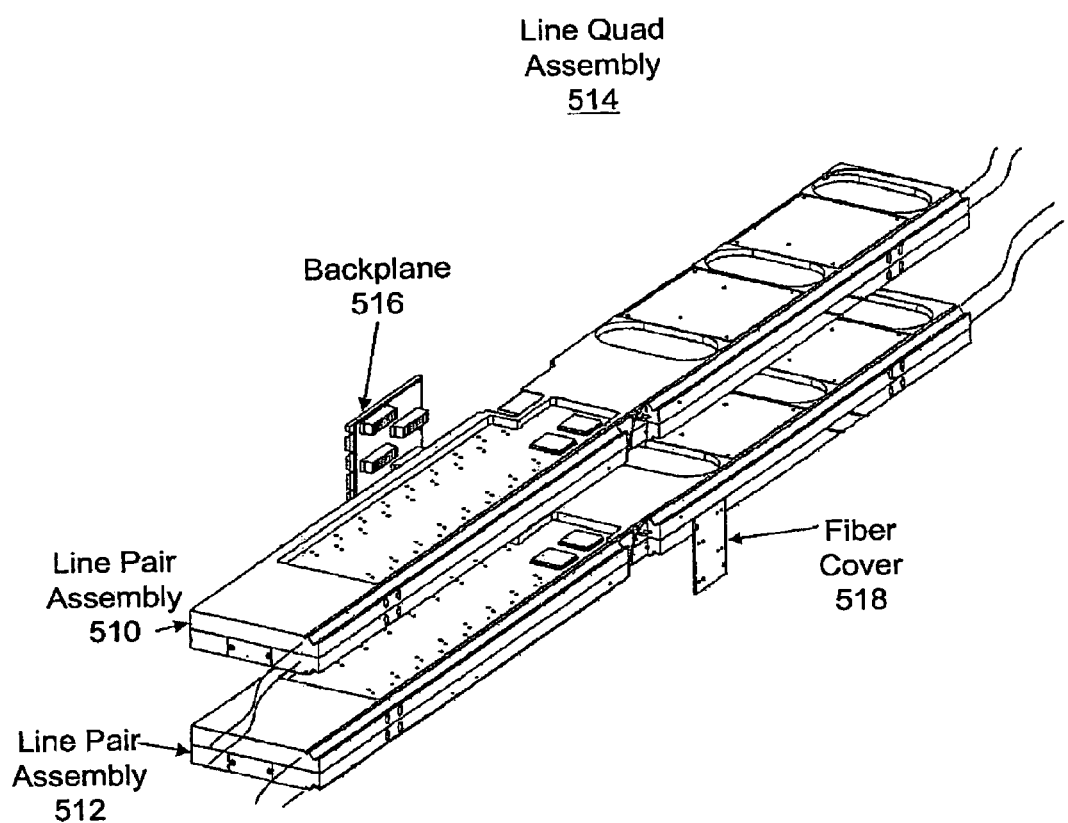
FIG. 21 shows the mounting arrangement between two line pair assemblies to create a line quad assembly according to exemplary embodiments of the present invention.
Figure 22:
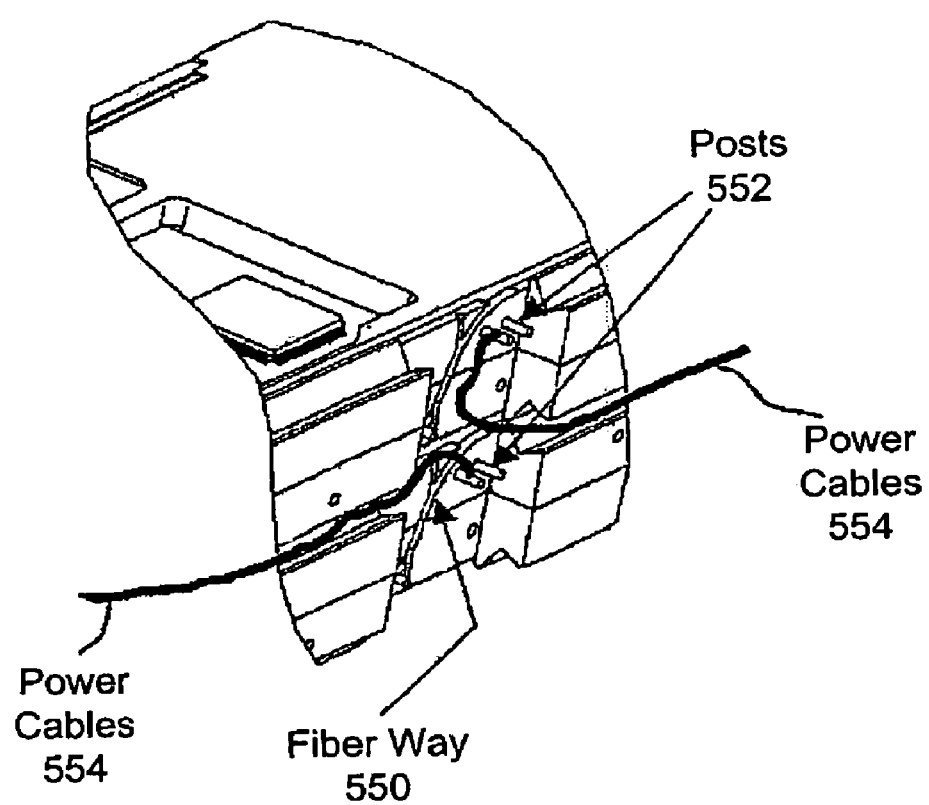
FIG. 22 is a cutaway portion illustrating the fiber ways and power connections for an exemplary line quad assembly according to the present invention.

Having described the mechanical layout of an exemplary line assembly according to exemplary embodiments of the present invention, the interconnections between the four line assemblies within a line quad assembly will now be discussed. With reference to FIG. 19, two line assemblies 500 and 501 are stacked and connected as a line pair assembly 504. Note that the PCBs 406 associated with each line assembly are disposed on opposite sides of the line pair assembly 504. In this way, the heat generated by the lasers 314 mounted on each line assembly 501 and 502 is further distributed within the repeater 16. Near the middle of each line assembly 501, 502 are fiber ways 506 for permitting optical fibers to connect components disposed on different line assemblies, e.g., components within 4×4 coupler subassemblies 416 connected to different line assemblies. These fiber ways 506 are better seen in the enlarged view of FIG. 20. FIG. 21 illustrates two line pair assemblies 510 and 512 being assembled into a single line quad assembly 514. A backplane 516 proivdes electronic and power/ground interconnections. Fiber cover 518 protects the fibers routed between line assemblies and line pair assemblies, as well as providing a mechanism to secure all four line assemblies together. As seen in FIG. 22, fiber ways 550 provide guides for routing optical fibers between line pair assemblies. Also seen in FIG. 22 are posts 552 which provide electrical connections via solder, crimp or screw connections for power cables 554 to provide DC electrical power to the line quad assembly 514.

Figure 23:
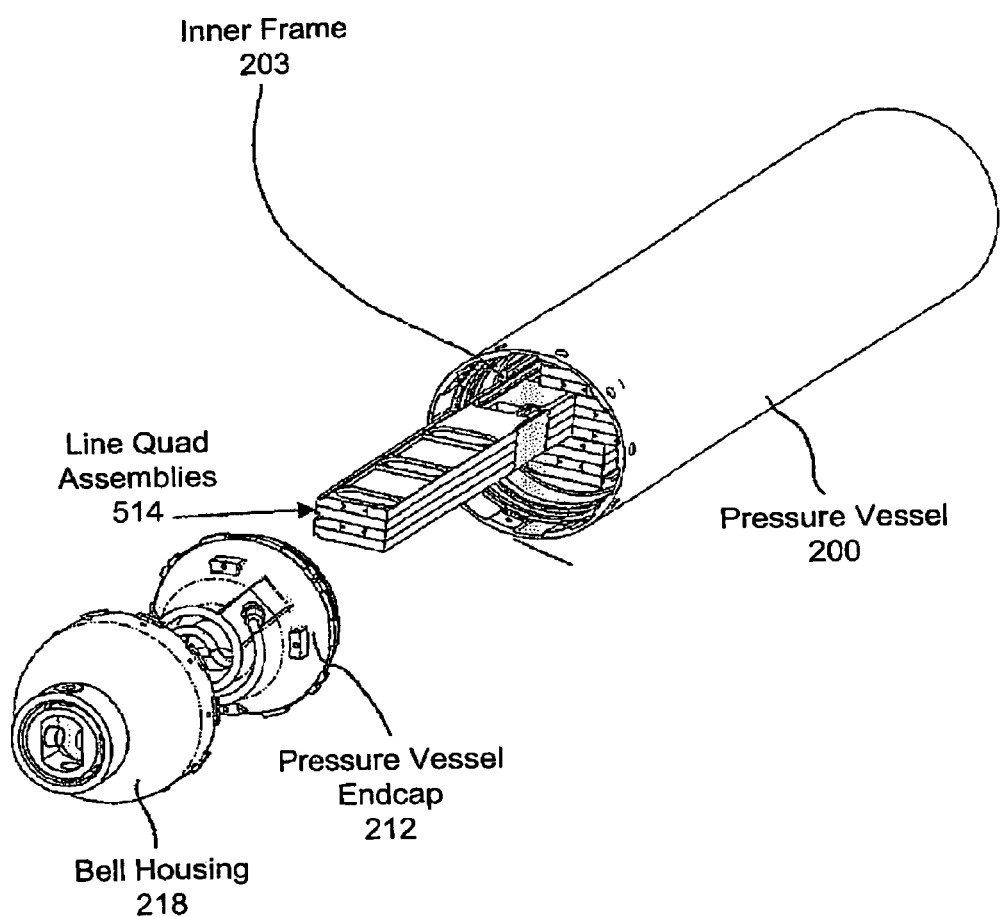
FIG. 23 is an exploded view of an exemplary repeater populated with four line quad assemblies according to the present invention.
Figure 24:
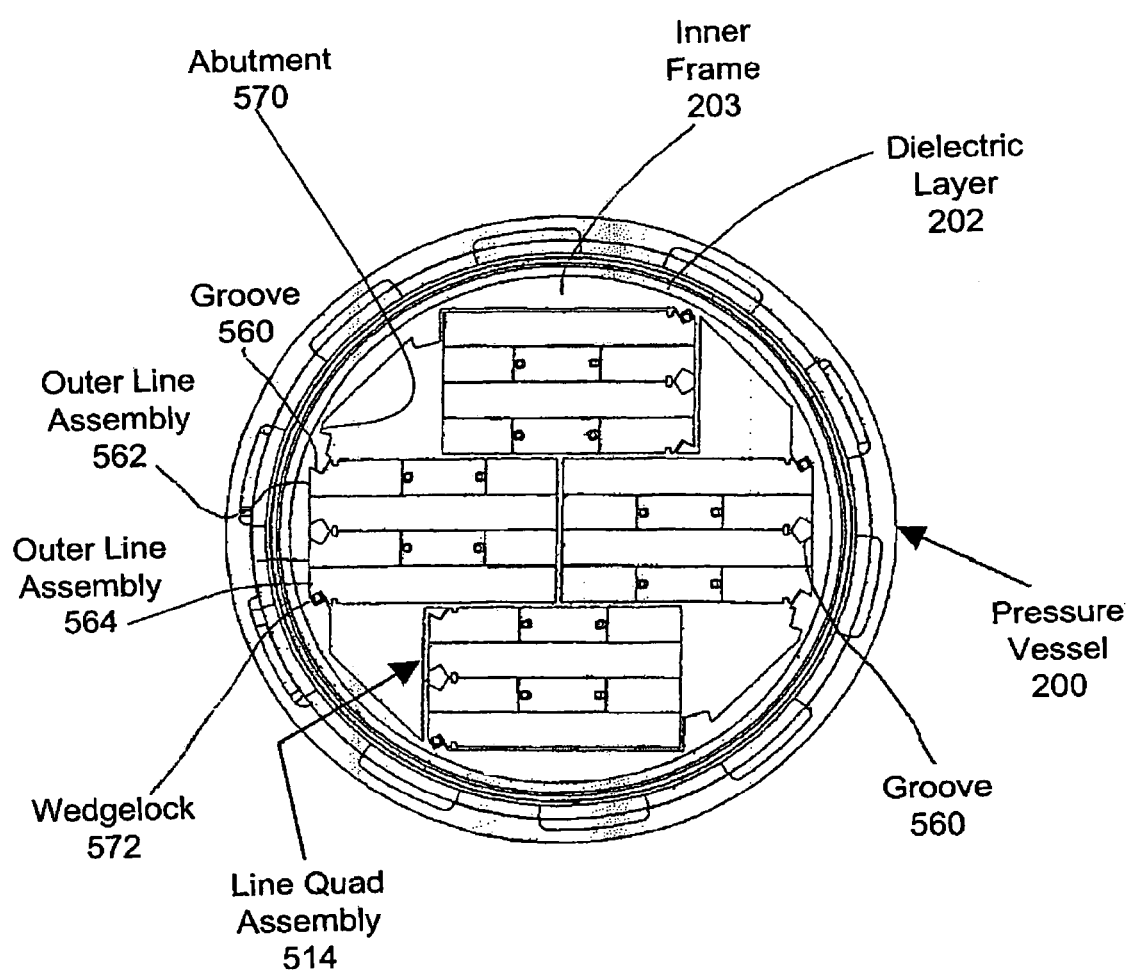
FIG. 24 is a sectional view which shows a plurality of line quad assemblies mounted in a repeater according to an exemplary embodiment of the present invention.

FIG. 23 shows an exemplary technique for provisioning a repeater 16 with four line quad assemblies 514 into the inner frame structure 203 of the pressure vessel 200. Those skilled in the art will appreciate that one, two, three or four line quad assemblies may be mounted therein, depending upon how many optical fiber pairs are being supported in the optical communication system. Various mechanisms can be used to secure the line quad assemblies 514 therein. According to one exemplary embodiment of the present invention, the line assemblies 400 each have a dovetail groove 560 formed therein as shown in FIG. 24. For the two outer line assemblies in each line quad assembly, e.g., 562 and 564, the dovetail groove 560 is used to secure the line quad assembly to the inner frame 203. For example, the dovetail groove in line assembly 562 can be slid into a mating engagement with abutment 570 in the inner frame 203. This engagement can be secured using, for example, a spring or a wedgelock 572 positioned within the dovetail groove of line assembly 564. The spring or wedgelock device 572 presses against the inner frame 203 and the dovetail groove of line assembly 564 using, e.g., 650 lbs of force, to lock its line quad assembly in place. Additional details regarding exemplary dovetail grooves and wedgelock devices which can be used in conjunction with high power repeaters according to the present invention can be found in commonly assigned, co-pending U.S. patent application Ser. No. 09949933, entitled "Use of Dovetail Slides and Wedge Locking Devices for Mounting", to Lowell Seal, filed on Sep. 12, 2001, and co-pending U.S. patent application Ser. No. 09948647, entitled "Integrated Wedge Lock and Elastic Member", to Bob Adams et at, filed on Sep. 10, 2001, the disclosures of which are incorporated here by reference.

Those skilled in the art will appreciate that the foregoing exemplary embodiments provide ground breaking new designs in the area of repeater technology for underwater optical communication systems. The foregoing techniques enable high density packaging of Raman amplification circuitry that permits system designers to meet legacy repeater size constraints. For example, using the cylinder dimensions shown in FIG. 3 of 1200 mm by 190 mm (radius), the foregoing exemplary embodiments enable Applicants to pack 150–300 (or more) pump lasers, 500 to 800 (or more)

passive optical components, 1000–2000 meters of optical fiber and 600–900 (or more) optical splices all in a volume of about 0.136 m³ (or less since the usable inner diameter of the pressure vessel will be less than the outer diameter shown in FIG. 3).

The foregoing exemplary embodiments have been set forth herein for the purpose of illustration. However, this description should not be deemed to be a limitation on the scope of the invention. For example, although the foregoing exemplary repeaters are discussed in the context of amplification schemes which use purely Raman amplification techniques, those skilled in the art will appreciate that EDFA amplification can, for some embodiments, be used as an alternative or to complement the Raman amplification described herein. Accordingly, various modifications, adaptations, and alternatives may occur to one skilled in the art without departing from the scope of the claimed inventive concept.

The invention claimed is:

1. A high power repeater for use in an undersea optical communication system, said repeater comprising:
   a pressure vessel;
   a frame, disposed within said pressure vessel, for holding optical signal amplification circuitry and other circuitry;
   a dielectric liner disposed between said pressure vessel and said frame;
   wherein said repeater draws more than 250 watts to power said optical signal amplification circuitry and other circuitry.

2. The high power repeater of claim 1, wherein said repeater draws more than 500 watts to power said optical signal amplification circuitry and other circuitry.

3. The high power repeater of claim 1, wherein said repeater draws more than 700 watts to power said optical signal amplification circuitry and other circuitry.

4. The high power repeater of claim 1, wherein said other circuitry includes at least one power supply.

5. The high power repeater of claim 1, wherein said other circuitry includes line monitoring circuitry.

6. The high power repeater of claim 1, wherein said optical signal amplification circuitry is Raman amplification circuitry.

7. The high power repeater of claim 6, wherein said Raman amplification circuitry includes more than 100 lasers in said repeater.

8. The high power repeater of claim 6, wherein said Raman amplification circuitry includes more than 200 lasers in said repeater.

9. The high power repeater of claim 1, further comprising:
   at least one line quad module disposed within said frame, each line quad module providing for Raman amplification of optical signals associated with at least two fiber pairs.

10. The high power repeater of claim 9, wherein said repeater includes four of said line quad modules.

11. The high power repeater of claim 9, wherein said at least one line quad modules are not electrically interconnected with one another.

12. The high power repeater of claim 9, wherein said at least one line quad modules are not optically interconnected with one another.

13. The high power repeater of claim 9, wherein each of said line quad modules includes a plurality of line assemblies which are optically interconnected with one another.

14. The high power repeater of claim 13, wherein a plurality of pump lasers disposed in a first one of said plurality of line assemblies generate pump energy which is pumped into a first optical fiber associated with said first one of said plurality of line assemblies and into a second optical fiber associated with a second one of said plurality of line assemblies.

15. The high power repeater of claim 1, wherein said optical signal amplification circuitry and said other circuitry are disposed on stacked, rectangular assemblies.

16. The high power repeater of claim 15, wherein each group of four stacked, rectangular assemblies are individually secured within said frame.

17. The high power repeater of claim 15, wherein said stacked, rectangular assemblies are disposed substantially parallel to a longitudinal axis of said pressure vessel.

18. The high power repeater of claim 1, wherein said dielectric liner has a breakdown voltage of greater than about 40 kV.

19. The high power repeater of claim 1, wherein said optical signal amplification circuitry includes a plurality of pump lasers, each of which generate pump energy at a predetermined wavelength, wherein a difference between a longest wavelength and a shortest wavelength of said plurality of pump lasers is greater than 90 nm.

20. The high power repeater of claim 19, wherein said pump energy from each of said plurality of pump lasers is combined and coupled to at least four optical fibers for amplifying optical data signals being carried by said at least four optical fibers.

21. A high power repeater for use in an undersea optical communication system, said repeater comprising:
   a pressure vessel;
   a frame, disposed within said pressure vessel, for holding optical signal amplification circuitry and other circuitry;
   a dielectric liner disposed between said pressure vessel and said frame;
   wherein said optical signal amplification circuitry includes at least 100 pump lasers for Raman amplification of optical data signals.

22. The high power repeater of claim 21, wherein said optical signal amplification circuitry includes more than 200 lasers in said repeater.

23. The high power repeater of claim 21, wherein each of said at least 100 pump lasers generate pump energy at a predetermined wavelength, wherein a difference between a longest wavelength and a shortest wavelength of said at least 100 pump lasers is greater than 90 nm.

24. The high power repeater of claim 23, wherein said pump energy from each of said at least 100 pump lasers is combined to generate a combined pumping signal and wherein said combined pumping signal is coupled to at least four optical fibers for amplifying optical data signals being carried by said at least four optical fibers.

25. The high power repeater of claim 21, wherein said other circuitry includes at least one power supply.

26. The high power repeater of claim 21, wherein said other circuitry includes line monitoring circuitry.

27. The high power repeater of claim 21, further comprising:
   at least one line quad module disposed within said frame, each line quad module providing for Raman amplification of optical signals associated with at least two fiber pairs.

28. The high power repeater of claim 21, wherein said high power repeater includes four of said line quad modules.

29. The high power repeater of claim 27, wherein said at least one line quad modules are not electrically interconnected with one another.

30. The high power repeater of claim 27, wherein said at least one line quad modules are not optically interconnected with one another.

31. The high power repeater of claim 27, wherein each of said line quad modules includes a plurality of line assemblies which are optically interconnected with one another.

32. The high power repeater of claim 31, wherein a subset of said at least 100 pump lasers are disposed in a first one of said plurality of line assemblies and generate pump energy which is pumped into a first optical fiber associated with said first one of said plurality of line assemblies and into a second optical fiber associated with a second one of said plurality of line assemblies.

33. The high power repeater of claim 21, wherein said optical signal amplification circuitry and said other circuitry are disposed on stacked, rectangular assemblies.

34. The high power repeater of claim 33, wherein each group of four stacked, rectangular assemblies are individually secured within said frame.

35. The high power repeater of claim 33, wherein said stacked, rectangular assemblies are disposed substantially parallel to a longitudinal axis of said pressure vessel.

36. The high power repeater of claim 21, wherein said dielectric liner has a breakdown voltage of greater than about 40 kV.

37. The high power repeater of claim 21, wherein said repeater draws more than 250 watts to power said optical signal amplification circuitry and other circuitry.

38. The high power repeater of claim 21, wherein said repeater draws more than 500 watts to power said optical signal amplification circuitry and other circuitry.

39. The high power repeater of claim 21, wherein said repeater draws more than 700 watts to power said optical signal amplification circuitry and other circuitry.

* * * * *